US00RE50882E

(19) United States
(12) Reissued Patent
Tikkanen et al.

(10) Patent Number: US RE50,882 E
(45) Date of Reissued Patent: *May 5, 2026

(54) CONFIGURABLE LED DRIVER/DIMMER FOR SOLID STATE LIGHTING APPLICATIONS

(71) Applicant: Mate. LLC, Oklahoma City, OK (US)

(72) Inventors: David Tikkanen, Waterloo (CA); Jason Neudorf, Kitchener (CA); Steven Lyons, Kitchener (CA); Kyle Hathaway, Kitchener (CA)

(73) Assignee: Mate LLC, Oklahoma City, OK (US)

( * ) Notice: This patent is subject to a terminal disclaimer.

(21) Appl. No.: 18/396,107

(22) Filed: Dec. 26, 2023

Related U.S. Patent Documents

Reissue of:
(64) Patent No.: 10,187,946
Issued: Jan. 22, 2019
Appl. No.: 15/688,055
Filed: Aug. 28, 2017

U.S. Applications:
(63) Continuation of application No. 17/153,989, filed on Jan. 21, 2021, now Pat. No. Re. 49,872, which is an
(Continued)

(51) Int. Cl.
*H05B 33/08* (2020.01)
*H05B 37/02* (2006.01)
(Continued)

(52) U.S. Cl.
CPC ..... *H05B 45/32* (2020.01); *H05B 45/385* (2020.01); *H05B 45/39* (2020.01); *H05B 45/60* (2020.01);
(Continued)

(58) Field of Classification Search
CPC ..... H05B 45/60; H05B 45/32; H05B 47/175; H05B 45/39; H05B 45/385; H05B 45/36;
(Continued)

(56) References Cited

U.S. PATENT DOCUMENTS 5,008,595 A 4/1991 Kazar
5,420,780 A 5/1995 Bernstein et al.
(Continued)

FOREIGN PATENT DOCUMENTS

CA 2913239 A1 12/2014
CN 201001217 1/2008
(Continued)

OTHER PUBLICATIONS

Canadian Intellectual Property Office, International Search Report for PCT/CA2019/051163, Nov. 7, 2019.
(Continued)

*Primary Examiner* — Woo H Choi
(74) *Attorney, Agent, or Firm* — Young's Patent Services; Bruce A. Young

(57) ABSTRACT

The disclosure is directed at a method and apparatus for configuring and powering light fixture loads for a LED low voltage distribution system. The method and apparatus include converting power being supplied for powering the set of light fixture loads and then limiting this converted power to a set of multiple current outputs supplied to the light fixture loads. The multiple current outputs are then split or regrouped prior to being delivered to the light fixture loads.

21 Claims, 22 Drawing Sheets

Related U.S. Application Data application for the reissue of Pat. No. 10,187,946, which is a continuation of application No. 15/070,502, filed on Mar. 15, 2016, now Pat. No. 9,775,207, which is a continuation of application No. 14/590,045, filed on Jan. 6, 2015, now Pat. No. 9,320,093, which is a continuation of application No. 13/466,509, filed on May 8, 2012, now Pat. No. 8,957,601, which is a continuation-in-part of application No. 13/059,336, filed as application No. PCT/CA2009/001295 on Sep. 17, 2009, now Pat. No. 8,525,446.

(60) Provisional application No. 61/097,963, filed on Sep. 18, 2008.

(51) Int. Cl.

| | |
|---|---|
| ***H05B 45/32*** | (2020.01) |
| ***H05B 45/385*** | (2020.01) |
| ***H05B 45/39*** | (2020.01) |
| ***H05B 45/60*** | (2022.01) |
| ***H05B 47/18*** | (2020.01) |
| *H05B 45/10* | (2020.01) |
| *H05B 45/20* | (2020.01) |
| *H05B 45/36* | (2020.01) |
| *H05B 45/375* | (2020.01) |
| *H05B 45/38* | (2020.01) |

(52) U.S. Cl.

CPC ..... *H05B 47/18* (2020.01); *H05B 45/10* (2020.01); *H05B 45/20* (2020.01); *H05B 45/36* (2020.01); *H05B 45/375* (2020.01); *H05B 45/38* (2020.01)

(58) Field of Classification Search

CPC ..... H05B 45/38; H05B 45/10; H05B 45/375; H05B 45/20

See application file for complete search history.

(56) References Cited

U.S. PATENT DOCUMENTS

| | | | |
|---|---|---|---|
| 5,640,061 | A | 6/1997 | Bornhorst et al. |
| 5,821,703 | A | 10/1998 | Callahan et al. |
| 5,920,186 | A | 7/1999 | Ninh et al. |
| 6,211,626 | B1 | 4/2001 | Lys et al. |
| 6,469,457 | B2 | 10/2002 | Callahan |
| 6,720,745 | B2 | 4/2004 | Lys et al. |
| 6,731,524 | B2 | 5/2004 | Elek et al. |
| 6,853,151 | B2 | 2/2005 | Leong et al. |
| 7,067,992 | B2 | 6/2006 | Leong et al. |
| 7,126,290 | B2 | 10/2006 | Elliott |
| 7,178,941 | B2 | 2/2007 | Roberge et al. |
| 7,233,115 | B2 | 6/2007 | Lys |
| 7,265,504 | B2 | 9/2007 | Grant |
| 7,274,175 | B2 | 9/2007 | Manolescu |
| 7,276,861 | B1 | 10/2007 | Shteynberg et al. |
| 7,276,863 | B2 | 10/2007 | Lee et al. |
| 7,307,614 | B2 | 12/2007 | Vinn |
| 7,310,074 | B2 | 12/2007 | Chen |
| 7,321,203 | B2 | 1/2008 | Marosek |
| 7,344,279 | B2 | 3/2008 | Mueller et al. |
| 7,358,679 | B2 | 4/2008 | Lys et al. |
| 7,358,706 | B2 | 4/2008 | Lys |
| 7,405,523 | B2 | 7/2008 | Wilhelm et al. |
| 7,439,944 | B2 | 10/2008 | Huynh et al. |
| 7,490,951 | B2 | 2/2009 | Klipstein et al. |
| 7,490,957 | B2 | 2/2009 | Leong et al. |
| 7,507,001 | B2 | 3/2009 | Kit |
| 7,511,437 | B2 | 3/2009 | Lys et al. |
| 7,560,677 | B2 | 7/2009 | Lyons et al. |
| 7,598,686 | B2 | 10/2009 | Lys et al. |
| 7,609,008 | B1 | 10/2009 | Kohler |
| 7,646,029 | B2 | 1/2010 | Mueller et al. |
| 7,656,103 | B2 | 2/2010 | Shteynberg et al. |
| 7,658,510 | B2 | 2/2010 | Russell |
| 7,750,616 | B2 | 7/2010 | Liu |
| 7,791,326 | B2 | 9/2010 | Dahlman et al. |
| 7,800,876 | B2 | 9/2010 | Peker et al. |
| 7,804,189 | B2 | 9/2010 | Koehler et al. |
| 7,825,610 | B2 | 11/2010 | Zhao et al. |
| 7,888,881 | B2 | 2/2011 | Shteynberg et al. |
| 7,902,769 | B2 | 3/2011 | Shteynberg et al. |
| 7,911,151 | B2 | 3/2011 | Xu |
| 7,928,670 | B2 | 4/2011 | Chen et al. |
| 7,952,294 | B2 | 5/2011 | Shteynberg et al. |
| 7,956,554 | B2 | 6/2011 | Shteynberg et al. |
| 7,961,113 | B2 | 6/2011 | Rabiner et al. |
| 8,022,634 | B2 | 9/2011 | Greenfeld |
| 8,025,424 | B2 | 9/2011 | Mondloch et al. |
| 8,033,677 | B1 | 10/2011 | Olsson et al. |
| 8,092,035 | B2 | 1/2012 | Mandy et al. |
| 8,106,604 | B2 | 1/2012 | Zhao et al. |
| 8,120,283 | B2 | 2/2012 | Tanaka et al. |
| 8,138,690 | B2 | 3/2012 | Chemel et al. |
| 8,143,792 | B2 | 3/2012 | Joo et al. |
| 8,143,805 | B2 | 3/2012 | Peng |
| 8,143,810 | B2 | 3/2012 | Ferro |
| 8,159,092 | B2 * | 4/2012 | Luthi ..... H02J 9/005 307/130 |
| 8,174,204 | B2 | 5/2012 | Melanson |
| 8,197,079 | B2 | 6/2012 | Ruud et al. |
| 8,232,745 | B2 | 7/2012 | Chemel et al. |
| 8,253,349 | B2 | 8/2012 | Shteynberg et al. |
| 8,253,666 | B2 | 8/2012 | Shteynberg et al. |
| 8,258,721 | B2 | 9/2012 | Meyer |
| 8,299,987 | B2 | 10/2012 | Neudorf et al. |
| 8,310,171 | B2 | 11/2012 | Reisenauer et al. |
| 8,319,445 | B2 | 11/2012 | McKinney et al. |
| 8,368,321 | B2 | 2/2013 | Chemel et al. |
| 8,373,362 | B2 | 2/2013 | Chemel et al. |
| 8,400,061 | B2 | 3/2013 | Kuang et al. |
| 8,436,555 | B2 | 5/2013 | Lo et al. |
| 8,441,210 | B2 | 5/2013 | Shteynberg et al. |
| 8,446,051 | B2 * | 5/2013 | Luthi ..... H02J 9/005 307/130 |
| 8,456,097 | B2 | 6/2013 | McKinney et al. |
| 8,471,496 | B2 | 6/2013 | Knapp |
| 8,525,446 | B2 | 9/2013 | Tikkanen et al. |
| 8,531,134 | B2 | 9/2013 | Chemel et al. |
| 8,543,249 | B2 | 9/2013 | Chemel et al. |
| 8,552,664 | B2 | 10/2013 | Chemel et al. |
| 8,558,470 | B2 | 10/2013 | Shteynberg et al. |
| 8,558,479 | B2 | 10/2013 | Kawata et al. |
| 8,571,411 | B2 | 10/2013 | Pederson et al. |
| 8,575,851 | B1 | 11/2013 | Bahrehmand |
| 8,581,504 | B2 | 11/2013 | Kost et al. |
| 8,604,712 | B2 | 12/2013 | Bloom et al. |
| 8,610,376 | B2 | 12/2013 | Chemel et al. |
| 8,620,205 | B2 * | 12/2013 | Higashi ..... G03G 15/5004 399/361 |
| 8,704,462 | B2 | 4/2014 | Shteynberg et al. |
| 8,705,258 | B2 | 4/2014 | Reese et al. |
| 8,710,764 | B2 | 4/2014 | Holec et al. |
| 8,723,441 | B2 | 5/2014 | Hoogzaad |
| 8,723,442 | B2 | 5/2014 | Omi |
| 8,723,766 | B2 | 5/2014 | Shteynberg et al. |
| 8,742,674 | B2 | 6/2014 | Shteynberg et al. |
| 8,742,684 | B2 | 6/2014 | Melanson |
| 8,742,686 | B2 | 6/2014 | Zampini et al. |
| 8,749,177 | B2 | 6/2014 | Shteynberg et al. |
| 8,754,585 | B1 | 6/2014 | Bahrehmand |
| 8,779,691 | B1 | 7/2014 | Rhodes |
| 8,779,695 | B2 | 7/2014 | Saes et al. |
| 8,786,191 | B2 | 7/2014 | Kuang et al. |
| 8,796,946 | B2 | 8/2014 | Rohner et al. |
| 8,829,812 | B2 | 9/2014 | Veltman |
| 8,853,958 | B2 | 10/2014 | Athalye et al. |
| 8,884,550 | B2 | 11/2014 | Shteynberg et al. |
| 8,896,989 | B2 | 11/2014 | Davis |
| 8,926,133 | B2 | 1/2015 | Booth |
| 8,952,625 | B2 | 2/2015 | Melanson |

(56) References Cited

U.S. PATENT DOCUMENTS

| | | | |
|---|---|---|---|
| 8,957,601 | B2 | 2/2015 | Tikkanen et al. |
| 9,035,563 | B2 | 5/2015 | Nuhfer et al. |
| 9,039,230 | B2 | 5/2015 | Crimi et al. |
| 9,041,305 | B2 | 5/2015 | Shteynberg et al. |
| 9,041,379 | B2 | 5/2015 | Lyons |
| 9,049,759 | B2 | 6/2015 | Tikkanen et al. |
| 9,078,310 | B2 | 7/2015 | Tikkanen et al. |
| 9,142,711 | B2 | 9/2015 | McKenzie et al. |
| 9,148,922 | B2 | 9/2015 | Shteynberg et al. |
| 9,173,273 | B2 | 10/2015 | Zudrell-Koch et al. |
| 9,258,864 | B2 | 2/2016 | Pederson |
| 9,270,194 | B2 | 2/2016 | Brogan et al. |
| 9,295,112 | B2 | 3/2016 | Knapp |
| 9,320,093 | B2 | 4/2016 | Tikkanen et al. |
| 9,413,457 | B2 | 8/2016 | Pederson et al. |
| 9,433,053 | B2 | 8/2016 | Neudorf |
| 9,485,833 | B2 | 11/2016 | Datta et al. |
| 9,497,821 | B2 | 11/2016 | Liu |
| 9,572,208 | B2 | 2/2017 | Melanson |
| 9,584,028 | B2 | 2/2017 | Shteynberg et al. |
| 9,591,713 | B2 | 3/2017 | Tikkanen et al. |
| 9,775,201 | B2 | 9/2017 | Koolen |
| 9,775,207 | B2 | 9/2017 | Tikkanen et al. |
| 9,807,827 | B2 | 10/2017 | Miskin et al. |
| 9,814,110 | B1 | 11/2017 | Hariharan |
| 9,848,482 | B2 | 12/2017 | Knapp |
| 9,894,730 | B2 | 2/2018 | Lethellier |
| 9,942,954 | B2 | 4/2018 | Neudorf et al. |
| 10,045,421 | B2 | 8/2018 | Tikkanen et al. |
| 10,076,016 | B2 | 9/2018 | Tikkanen et al. |
| 10,091,842 | B2 | 10/2018 | Miskin et al. |
| 10,159,126 | B2 | 12/2018 | Welten |
| 10,187,946 | B2 | 1/2019 | Tikkanen et al. |
| 10,356,857 | B2 | 7/2019 | Melanson |
| 10,492,260 | B2 | 11/2019 | Miskin et al. |
| 10,820,391 | B2 | 10/2020 | Pederson |
| 2002/0047642 | A1 | 4/2002 | Miyagawa |
| 2003/0209997 | A1 | 11/2003 | St-Germain et al. |
| 2005/0128751 | A1 | 6/2005 | Roberge et al. |
| 2005/0162101 | A1 | 7/2005 | Leong et al. |
| 2005/0213353 | A1 | 9/2005 | Lys |
| 2005/0218838 | A1 | 10/2005 | Lys |
| 2005/0269997 | A1 | 12/2005 | Usui et al. |
| 2005/0289279 | A1 | 12/2005 | Fails et al. |
| 2006/0022214 | A1 | 2/2006 | Morgan et al. |
| 2006/0076908 | A1 | 4/2006 | Morgan et al. |
| 2006/0109204 | A1 | 5/2006 | Chen |
| 2006/0132063 | A1 | 6/2006 | Hung et al. |
| 2006/0274468 | A1 | 12/2006 | Phadke |
| 2007/0222399 | A1 | 9/2007 | Bondy et al. |
| 2007/0228999 | A1 | 10/2007 | Kit |
| 2007/0267984 | A1 | 11/2007 | Peng |
| 2007/0273299 | A1 | 11/2007 | Miskin et al. |
| 2008/0018261 | A1 | 1/2008 | Kastner |
| 2008/0025028 | A1 | 1/2008 | Gloisten et al. |
| 2008/0079796 | A1 | 4/2008 | Makuta et al. |
| 2008/0123340 | A1 | 5/2008 | McClellan |
| 2008/0191642 | A1 | 8/2008 | Slot et al. |
| 2008/0197786 | A1 | 8/2008 | Schaible et al. |
| 2008/0203945 | A1 | 8/2008 | Deurenberg et al. |
| 2008/0224629 | A1 | 9/2008 | Melanson |
| 2008/0290814 | A1 | 11/2008 | Leong et al. |
| 2009/0179594 | A1 | 7/2009 | Yang |
| 2009/0187925 | A1 | 7/2009 | Hu et al. |
| 2009/0206660 | A1 | 8/2009 | Makita et al. |
| 2009/0237007 | A1 | 9/2009 | Leng |
| 2009/0251068 | A1 | 10/2009 | Holec et al. |
| 2009/0295300 | A1 | 12/2009 | King |
| 2009/0315480 | A1 | 12/2009 | Yan et al. |
| 2010/0060194 | A1 | 3/2010 | Furry et al. |
| 2010/0066267 | A1 | 3/2010 | Meyer |
| 2010/0134038 | A1 | 6/2010 | Shackle et al. |
| 2010/0164403 | A1 | 7/2010 | Liu |
| 2010/0231136 | A1 | 9/2010 | Reisenauer et al. |
| 2010/0237695 | A1 | 9/2010 | Covaro et al. |
| 2010/0259953 | A1 | 10/2010 | Matthews |
| 2010/0280677 | A1 | 11/2010 | Budike, Jr. |
| 2011/0018464 | A1 | 1/2011 | Lo et al. |
| 2011/0204820 | A1 | 8/2011 | Tikkanen et al. |
| 2011/0234109 | A1 | 9/2011 | Chiu |
| 2011/0309746 | A1 | 12/2011 | Eckel et al. |
| 2012/0007512 | A1 | 1/2012 | Kim et al. |
| 2012/0049745 | A1 | 3/2012 | Li et al. |
| 2012/0086356 | A1 | 4/2012 | Chan et al. |
| 2012/0280632 | A1 | 11/2012 | Kim et al. |
| 2012/0286696 | A1 | 11/2012 | Ghanem |
| 2012/0323394 | A1 | 12/2012 | Gandhi |
| 2013/0016531 | A1 | 1/2013 | Aso |
| 2013/0057247 | A1 | 3/2013 | Russell et al. |
| 2013/0063047 | A1 | 3/2013 | Veskovic |
| 2013/0241527 | A1 | 9/2013 | Russell et al. |
| 2013/0293106 | A1 | 11/2013 | Maxik et al. |
| 2014/0103804 | A1 | 4/2014 | Zhdanau et al. |
| 2014/0184076 | A1 | 7/2014 | Murphy |
| 2014/0265931 | A1 | 9/2014 | Greenwood |
| 2015/0008837 | A1 | 1/2015 | Teufel |
| 2015/0028778 | A1 | 1/2015 | Zudrell-Koch |
| 2015/0097484 | A1 | 4/2015 | Lee et al. |
| 2015/0257223 | A1 | 9/2015 | Siessegger et al. |
| 2015/0327340 | A1 | 11/2015 | Siessegger et al. |
| 2016/0128144 | A1 | 5/2016 | Tikkanen et al. |
| 2016/0227616 | A1 | 8/2016 | Lee |
| 2017/0110873 | A1 | 4/2017 | Glovinski et al. |
| 2017/0127497 | A1 | 5/2017 | Baek et al. |
| 2017/0332462 | A1 | 11/2017 | Tikkanen |
| 2018/0116022 | A1 | 4/2018 | Lõrincz et al. |
| 2020/0056770 | A1 | 2/2020 | Chemel et al. |
| 2020/0068680 | A1 | 2/2020 | Neudorf et al. |
| 2022/0364695 | A1 | 11/2022 | Shah et al. |

FOREIGN PATENT DOCUMENTS

| | | | |
|---|---|---|---|
| CN | 101325366 | A | 12/2008 |
| CN | 102201958 | B | 12/2013 |
| DE | 102012100352 | | 7/2013 |
| JP | 2006344919 | A | 12/2006 |
| JP | 2011015472 | A | 1/2011 |
| KR | 20110092100 | A | 8/2011 |
| TW | 1384898 | B | 2/2013 |
| WO | 2003067934 | A2 | 8/2003 |
| WO | 2008052293 | | 5/2008 |
| WO | 2008052293 | A1 | 5/2008 |
| WO | 2009039112 | | 3/2009 |
| WO | 2009039112 | A1 | 3/2009 |
| WO | 2010031169 | A1 | 3/2010 |
| WO | 2010035168 | A1 | 4/2010 |
| WO | 2011002280 | A1 | 1/2011 |
| WO | 2020082178 | A1 | 4/2020 |

OTHER PUBLICATIONS

Canadian Intellectual Property Office, Written Opinion of the ISA for PCT/CA2019/051163, Nov. 7, 2019.

Chang, Novel AC Driver and Protection Circuits With Dimming Control for LEDs, 2007.

Inns, Controlling LED Brightness Using PWM, Apr. 15, 2010.

Lighting Reseach Center, Lighting Research Program Project 3.2 Energy Efficient Load Shedding Lighting Technology, Feb. 2008.

Maxim Integrated, Driving LEDs with Constant Current Port Expander Outputs, Sep. 12, 2003.

Nuttall, Design of a LED Street Lighting System, Apr. 2-4, 2008.

Office Action Response for U.S. Appl. No. 17/153,989, dated Apr. 12, 2023.

Office Action Response for U.S. Appl. No. 17/153,989, dated Aug. 14, 2023.

O'shea, LED Dimming Solutions, Jan. 26, 2012.

Steigerwald, et al., Illumination With SSL Technology, Mar. 2002.

Stmicroelectonics, Vipower: Dimmable Driver for High Brightness LEDs With VIPER228-E, Mar. 2007.

Texas Instruments, LED Lighting Power Controller, Oct. 2008.

(56) References Cited

OTHER PUBLICATIONS

United States Patent and Trademark Office, Final Office Action for U.S. Appl. No. 17/153,989, dated May 12, 2023.
United States Patent and Trademark Office, Non-Final Office Action for U.S. Appl. No. 17/153,989, dated Dec. 21, 2022.
United States Patent and Trademark Office, Notice of Allowance for U.S. Appl. No. 17/153,989, dated Oct. 4, 2023.
USPTO, Non-Final Office Action in related case U.S. Appl. No. 16/549,425, Mar. 5, 2020.
Xu, et al., High Dimming Ratio LED Driver With Fast Transit Boost Converter, Jun. 15, 2008.
Ericsson AB, Power Supplies Goes Digital White Paper, Oct. 2006.
Skanda; Microchip Technology Inc., Power Factor Correction in Power Conversion Applications using the dsPIC® DSC , AN1106, Jun. 2007.
Traxon Technologies, LED Engine XB 3W-108 Technical Specifications and User Manual Version 1.1, 2007.
Penwell Corporation, Dialight Lumidrives Launches Colurdriver XP for High-Power LEDs, LEDs Magazine, downloaded from http://www.ledsmagazine.com/press/15469, Sep. 25, 2007.
Colourdriver XP data sheet, Jul. 30, 2008.
US-Tech Online, Dialight: New High Power LED Driver, downloaded from http://www.us-tech.com, Oct. 2007.
IST Ltd., iDrive™ 1000 the Intelligent 210W LED Driver User Manual, v. 1.7, Jun. 20, 2008.
Roal Electronics, S.P.A, Programmable RGB LED Driver 200 Watts Model RHPS180 Product Details, Rev. 2, Oct. 2007.
International Searching Authority (CA), International Search Report and Written Opinion for International Patent Application No. PCT/CA2009/001295, dated Jan. 13, 2010.
Search & Examination Report (UK), Further Search Report and Examination Report for GB1102782.8, dated Sep. 6, 2012.
United States Patent and Trademark Office, Office Action for U.S. Appl. No. 13/059336, dated Jan. 23, 2013.
United States Patent and Trademark Office, Office Action for U.S. Appl. No. 13/466,529, dated Dec. 13, 2013.
United States Patent and Trademark Office, Office Action for U.S. Appl. No. 13/466,509, dated Feb. 21, 2014.
United States Patent and Trademark Office, Office Action for U.S. Appl. No. 13/466,509, dated Jun. 27, 2014.
United States Patent and Trademark Office, Notice of Allowance for U.S. Appl. No. 13/466,509, dated Oct. 6, 2014.
Power Vector, A Division of Electronic Craftsmen, Product Information Sheet for IRIS LED Driver/Dimmer, Oct. 22, 2007.
Tryka L.E.D. Ltd, Product Information Sheet for IDS-12 Intelligent Drive System, http://www.tryka.co.uk/IDS-12.htm, downloaded Jul. 18, 2007.
United States Patent and Trademark Office, Office Action for U.S. Appl. No. 13/941,871, dated Feb. 5, 2015.
United States Patent and Trademark Office, Notice of Allowance for U.S. Appl. No. 14/597,788, dated May 11, 2015.
United States Patent and Trademark Office, Notice of Allowance for U.S. Appl. No. 14/590,045, dated Sep. 30, 2015.
United States Patent and Trademark Office, Office Action for U.S. Appl. No. 15/070,502, dated Jul. 28, 2016.
United States Patent and Trademark Office, Final Office Action for U.S. Appl. No. 15/070,502, dated Dec. 22, 2016.
United States Patent and Trademark Office, Notice of Allowance for U.S. Appl. No. 15/070,502, dated May 30, 2017.

* cited by examiner

CONFIGURABLE LED DRIVER/DIMMER FOR SOLID STATE LIGHTING APPLICATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*Notice: More than one reissue application has been filed for the reissue of U.S. Pat. No. 10,187,946. The reissue applications are U.S. application Ser. No. 17/153,989 (a parent reissue application), and Ser. No. 18/396,107 (the present application, which is a continuation reissue of U.S. application Ser. No. 17/153,989).*

This application *is a continuation reissue of U.S. patent application Ser. No. 17/153,989, filed Jan. 21, 2021, which is itself an application for reissue of U.S. patent application Ser. No. 15/688,055, filed Aug. 28, 2017, now U.S. Pat. No. 10,187,946, which* is *itself* a continuation of U.S. patent application Ser. No. 15/070,502, filed Mar. 15, 2016*, now U.S. Pat. No. 9,775,207*, which is itself a continuation of U.S. patent application Ser. No. 14/590,045, filed Jan. 6, 2015, now U.S. Pat. No. 9,320,093 which is itself a continuation of U.S. patent application Ser. No. 13/466,509, now U.S. Pat. No. 8,957,601, filed May 8, 2012, which is itself a continuation-in-part of U.S. patent application Ser. No. 13/059,336, now U.S. Pat. No. 8,525,446, filed Feb. 16, 2011, which is a national stage filing under 35 U.S.C. 371 of International Patent Application PCT/CA2009/001295, filed on Sep. 17, 2009, which claims the benefit of U.S. Provisional Patent Application No. 61/097,963, filed Sep. 18, 2008, all of which are incorporated herein by reference.

BACKGROUND OF THE DISCLOSURE

With the rapid increase in light emitting diode (LED) efficacies for high powered LEDs, the latest technologies have exceeded incandescent and halogen sources and are now starting to compete with fluorescent, mercury vapour, metal halide and sodium lighting. In addition to better energy usage, LEDs also have considerable advantages over traditional light sources such as long life, better durability and improved color generating abilities. The advancement of LED technology by various manufacturers has produced high power LEDs with various recommended drive currents such as 350 mA, 500 mA, 700 mA, 1000 mA, and 1400 mA or higher.

In recent years, controllable power sources for Solid State Lighting (SSL) applications have entered the market with integrated features. In addition, digital controllers within power sources have enabled the development of configurable options to provide a wider flexibility of solutions for Solid State Lighting applications. The ability to dim the light output of LEDs is also important to reduce energy consumption.

However, lighting companies are faced with considerable challenges in adopting SSL technology due to their unfamiliarity and lack of expertise in the driving and dimming requirements for LEDs.

Therefore, there is provided a novel LED Driver/dimmer for solid state lighting applications.

SUMMARY OF THE DISCLOSURE

With the wide variety of communication interface options and LED drive currents available for numerous architectural and entertainment Solid State Lighting applications, the configurable LED Driver/dimmer of the current disclosure includes at least one of the following advantages: configurable output current options that maximize the available power in the "front end" PFC and isolated power conversion converter stage; multiple drive current options for the multiple LED drive current options for various LEDs; elimination of a cooling fan which can present issues with audible noise and flexibility in where the power source is located, relatively low standby power consumption during "black out" lighting conditions, where "black out" refers to no load operation on the output of the dimmer/driver; multiple communication interface options; the ability to map output current sources/channels to different DMX512A addresses and the ability to configure multiple groups of output current sources/channels such that each group is controlled by one 0-10 Vdc analog signal.

Some embodiments of the present disclosure are directed to a highly efficient enclosed, configurable power source, controllable by various external communication interfaces and a method for driving and dimming LEDs or OLEDs in lighting fixtures such as used for architectural or entertainment lighting applications. Such applications can include, but are not limited to, theater, convention centers, cruise ships, architectural building features, amusement parks, museums, and hospitality lighting in restaurants and bars.

In one aspect of the present disclosure, there is provided a configurable light emitting diode (LED) driver/dimmer for controlling a set of light fixture loads comprising: a power circuit; a primary digital controller for controlling the power circuit; a set of output current drivers, each of the set of output current drivers connected to one of the set of light fixture loads for controlling the associated light fixture load; a secondary digital controller for controlling the set of output current drivers; wherein the secondary controller transmits LED control information to control outputs of the set of output current drivers; and wherein the secondary digital controller provides digital feedback control information to the primary digital controller.

In another aspect of the present disclosure, there is provided a configurable power source that provides a plurality of output channels, such as 6, 8, 9, or 12, to color change or dim OLED or LED loads. In color changing applications, the number of available channels is a multiple of three or four to accommodate either red/green/blue LED loads or red/green/blue/amber or white LED loads. The number of output channels and available output power is increased or maximized based on the LED current requirements. The output channels are programmable by means of in circuit serial programming (ICSP) ports and calibrated by a secondary digital controller to the required output current and other parameters such as dimming frequency range.

In another embodiment, the dimming of multiple monochromatic color or white LED loads (output channels) utilizing a single 0-10 Vdc analog control signal, or the control of groups of LED loads (output channels) with an associated 0-10 Vdc analog control signal for each group is contemplated.

In another aspect of the present disclosure, the output channels are digitally controlled current sources configurable for various peak currents to power and control a variety of LEDs. The LED average current is encoded within the three variables of on-time, off-time, and period whereby no three variables are held constant. Depending on the output drive currents of the LED loads, the number of available output channels is maximized based on the maximum output power available from the power factor and isolated DC/DC converter stages.

In another aspect of the present disclosure, the configurable power source is housed in a rectangular enclosure with a monolithic aluminum extrusion and a U shaped aluminum chassis and metal end plates. Various electrical components are thermally coupled to the heatsink to increase or maximize heat transfer to the outside surface of the enclosure.

In another aspect of the present disclosure, the power source includes a digital controller to decrease power consumption of a relay coil as part of an inrush current limit circuit to reduce power consumption and improve efficiency.

In another aspect of the present disclosure, the power source utilizes an independent efficient auxiliary power source and one or more digital controllers to provide power to the communication interface. A digital controller disables various electrical circuits during black out lighting conditions to reduce no load power consumption and improve efficiency.

BRIEF DESCRIPTION OF DRAWINGS

Embodiments of the present disclosure will now be described, by way of example only, with reference to the attached Figures, wherein.

DETAILED DESCRIPTION OF PREFERRED EMBODIMENT

In general, the present disclosure is directed at a method and apparatus for providing a configurable LED Driver/dimmer. In the current description, the Driver/dimmer will be referred to as a dimmer, however, it will be understood that the configurable apparatus can function as either a driver, a dimmer or both. In the preferred embodiment, the dimmer is used for Solid State Lighting (SSL) applications.

Figure 1:
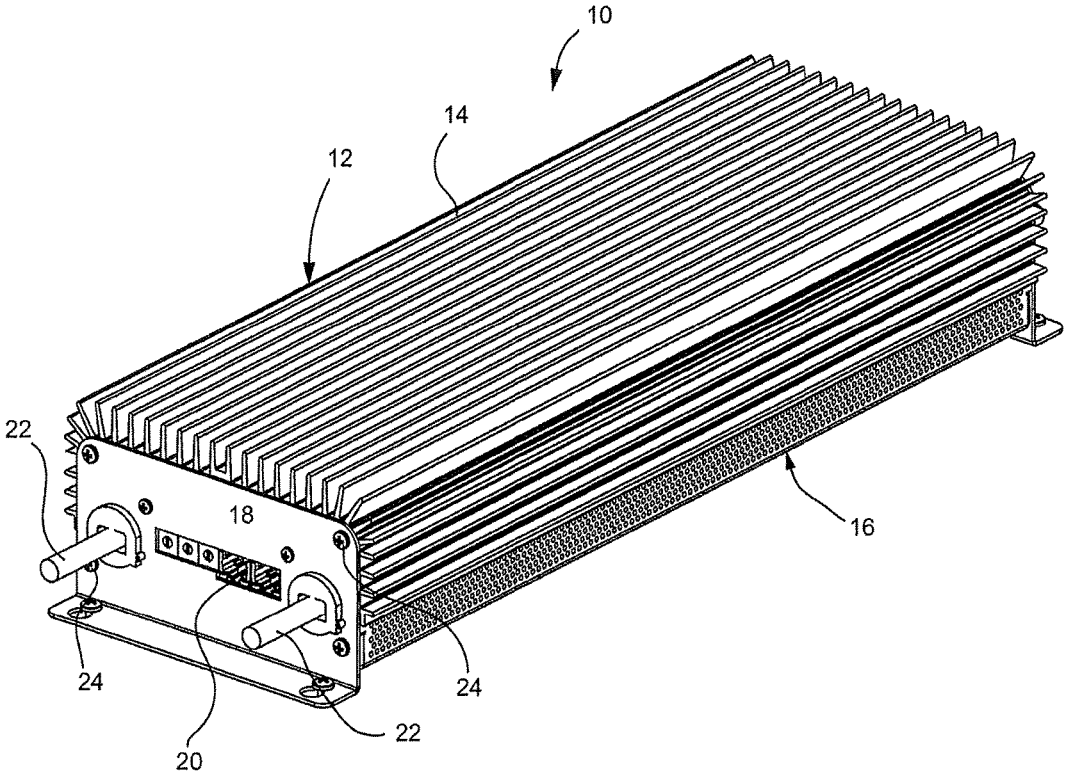
FIG. 1 is a perspective view of a configurable LED Driver/dimmer.

Turning to FIG. 1, a perspective view of an LED dimmer is shown. The LED dimmer 10 includes a body portion 12, or housing, which includes a monolithic aluminum heatsink 14 and a U-shaped chassis 16. Cross-sectional views of the dimmer 10 are provided in FIGS. 2a and 2b.

The dimmer 10 further includes a front plate 18 which includes a plurality of ports 20 along with a set of conductor cables 22. The front plate 18 is fastened to the body portion 12 via a set of fasteners 24, such as screws. In this embodiment, as conductor cables are used to provide output power to LED/OLED loads, the space requirement for the front plate 18 is reduced with respect to other known connection means such as terminal blocks.

Figure 2A:
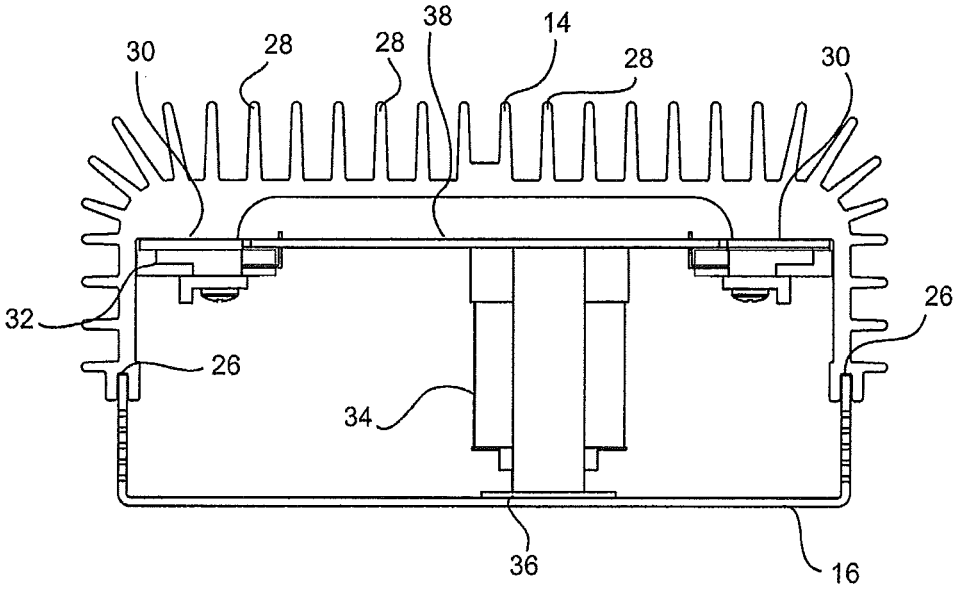
FIGS. 2a and 2b are cross-sectional views of the configurable LED Driver/dimmer.
Figure 2B:
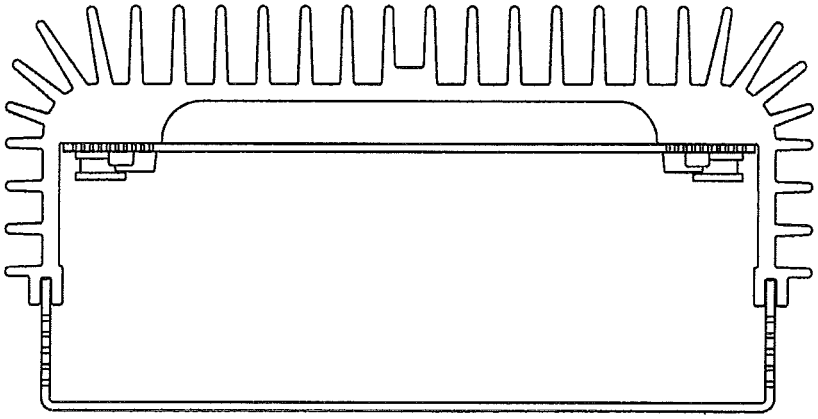
Figure 2C:
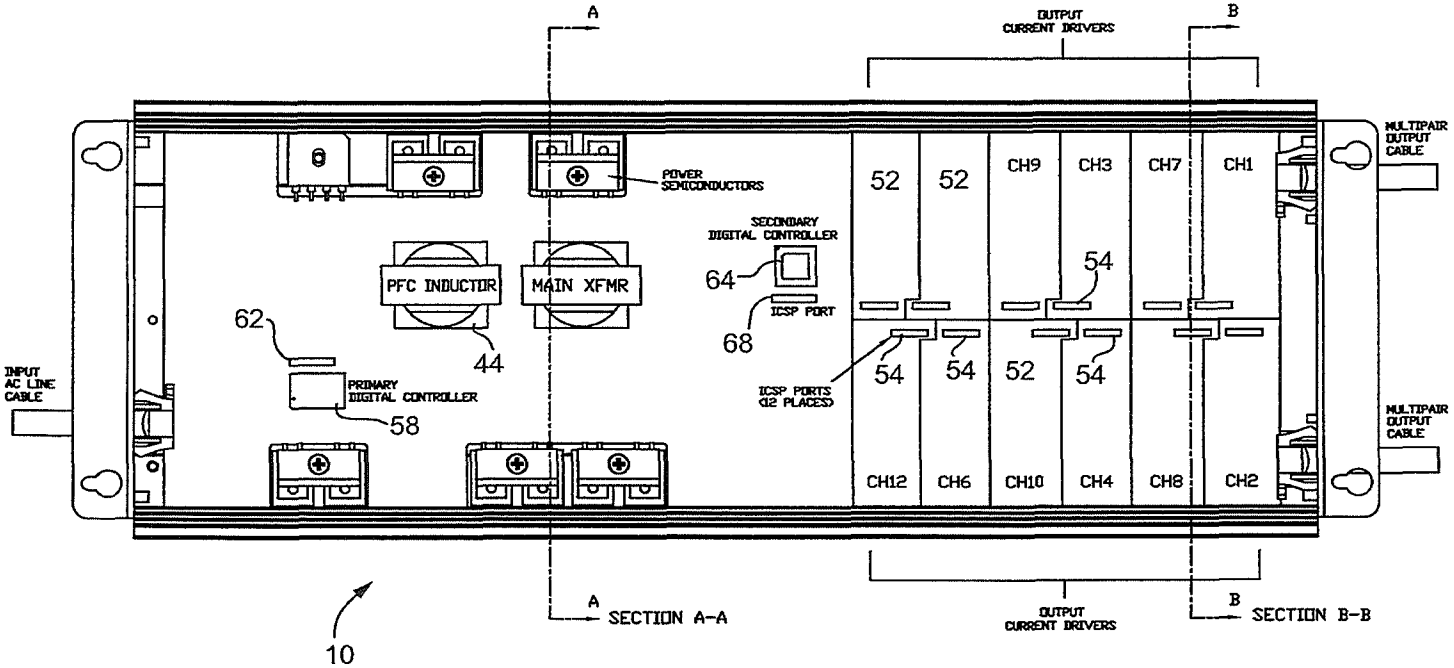
FIG. 2c is a schematic view of an internal layout of the LED Driver/dimmer.

Turning to FIGS. 2a and 2b, a pair of cross-sectional views of the LED dimmer are provided. FIG. 2c is a schematic view of one embodiment of an internal layout of the dimmer 10. The cross-sectional views for FIGS. 2a and 2b are taken along lines A-A and B-B of FIG. 2c respectively.

As shown, the heatsink 14 includes a receptacle portion 26 for receiving the ends of the chassis 16. In order to increase, or optimize, the heat dissipation capability of the configurable dimmer 10 at full output power, the extruded aluminum heatsink 14 includes fins 28 to increase the surface area for heat dissipation. The heatsink 14 also has a mounting platform 30 for receiving power components, or semiconductors 32, such as a bridge rectifier, MOSFETs, and/or diodes to efficiently transfer heat to the outside surface of the heatsink 14. These components will be discussed in more detail below with respect to FIG. 3. A power factor inductor and main isolation transformer pair 34 are thermally coupled to the chassis 16 by a thermally conductive, electrically isolated material 36 to further improve heat dissipation of these components. A circuit board 38 is also mounted to the heatsink 14.

Figure 3:
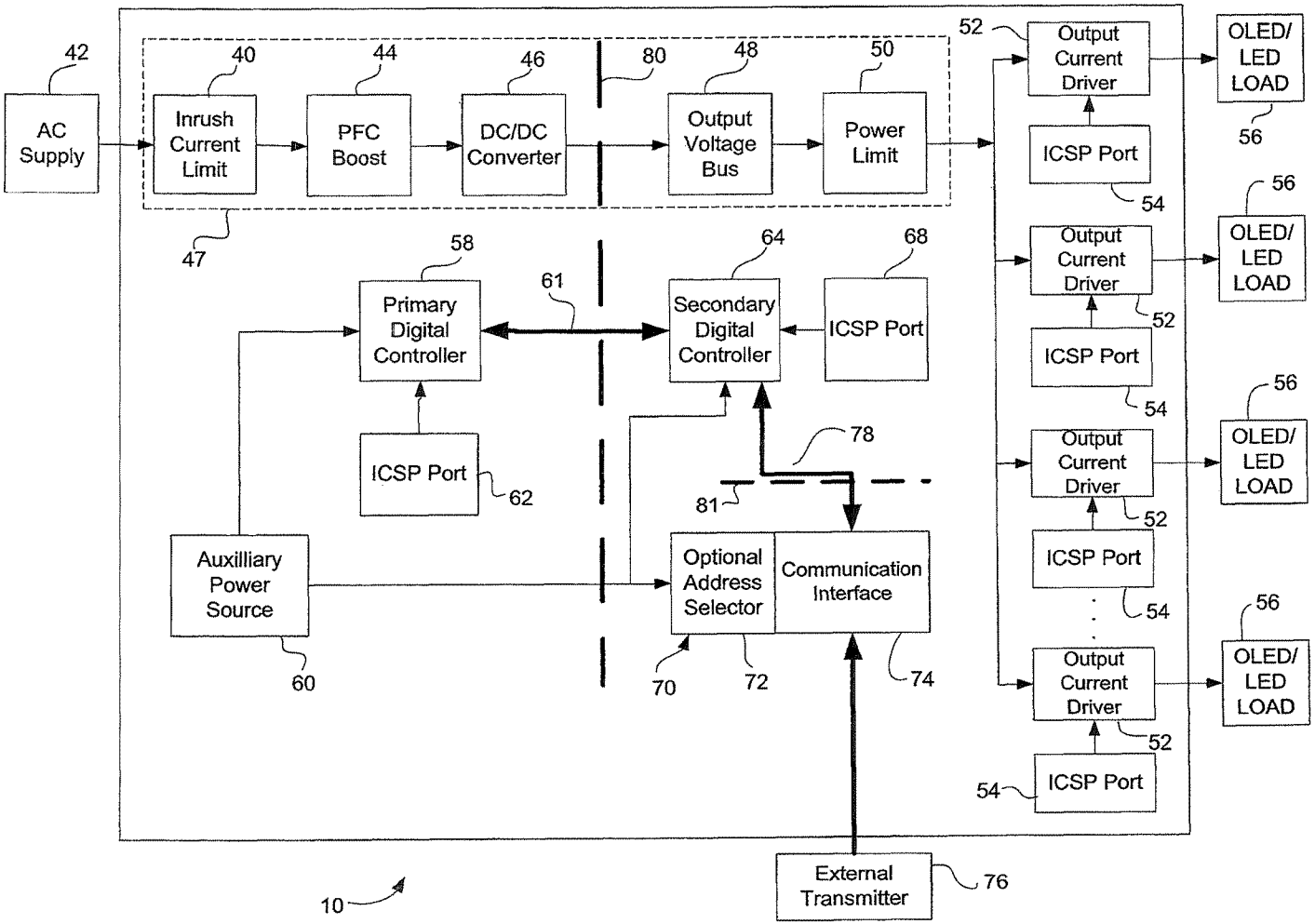
FIG. 3 is a schematic block diagram of the configurable LED Driver/dimmer.

Turning to FIG. 3, a block diagram of another embodiment of the LED dimmer is shown. The LED dimmer 10 includes an inrush current limit 40, or inrush current limit circuit, which receives power from an AC power source or supply 42, located external to the dimmer 10. The inrush circuit 40 is connected to a Power Factor Correction (PFC) Boost 44 which, in turn, is connected to a DC/DC Converter 46, or power conversion stage. The converter 46 is connected to an Output Voltage bus 48 which is connected to a power limiter 50. The inrush circuit 40, the PFC boost 44, the DC/DC converter 46, the Output Voltage bus 48 and the power limit 50 can be seen as a power circuit 47. Although only one power limit 50 is shown, it will be understood that there could be multiple power limits. The power limiter 50 is connected to a set of output current drivers 52, whereby each of the output current drivers 52 has an associated in-circuit serial programming (ICSP) port 54. The output of the output current drivers 52 is connected to individual Organic Light-Emitting Diodes (OLED)/Light-Emitting Diodes (LED) loads 56, further referred to as LED loads.

Along with the above-identified components and circuitry, the dimmer 10 further includes a primary digital controller 58 which is connected to an auxiliary power source 60 and an ICSP Port 62. The primary digital controller 58 is further connected, via an isolated communication bus 61 to a secondary digital controller 64, which receives power from the auxiliary power source 60. An ICSP port 68 is also connected to the secondary digital controller 64.

The auxiliary power source 60 is also used to power an interface component 70 which includes an optional address selector 72 and a communication interface 74. The communication interface 74 receives inputs from an external transmitter 76 and communicates via an isolated serial communication bus 78 with the secondary digital controller 64. A set of isolation barriers 80 and 81 are located within the dimmer 10, each barrier separating various components of the dimmer 10 from each other.

As will be understood, not all of the components or connections of the LED dimmer 10 required for operation are shown as they will be understood by one skilled in the art. For instance, the dimmer 10 can also include an EMI filter and a bridge rectifier. With respect to connections, it will be understood that the primary digital controller 58 can also be connected to the PFC boost 44, the inrush current limit 40 and the DC/DC converter 46 while the secondary digital controller 64 can be connected to the output voltage bus 48, the power limit 50 and the output current drivers 52.

In operation, the PFC Boost 44 and DC/DC Converter 46 are controlled by the primary side digital controller 58 while the secondary digital controller 64 monitors the output voltage bus 48 and provides digital feedback control information via isolated communication bus 61 to regulate the output voltage bus 48. Secondary digital controller 64 also translates dimming and/or color mixing information from the external transmitter 76 into LED control information for the output current drivers 52. The primary 58 and secondary 64 digital controllers and output current drivers 52 have an associated programming port for further configuring the LED dimmer 10.

Figure 4:
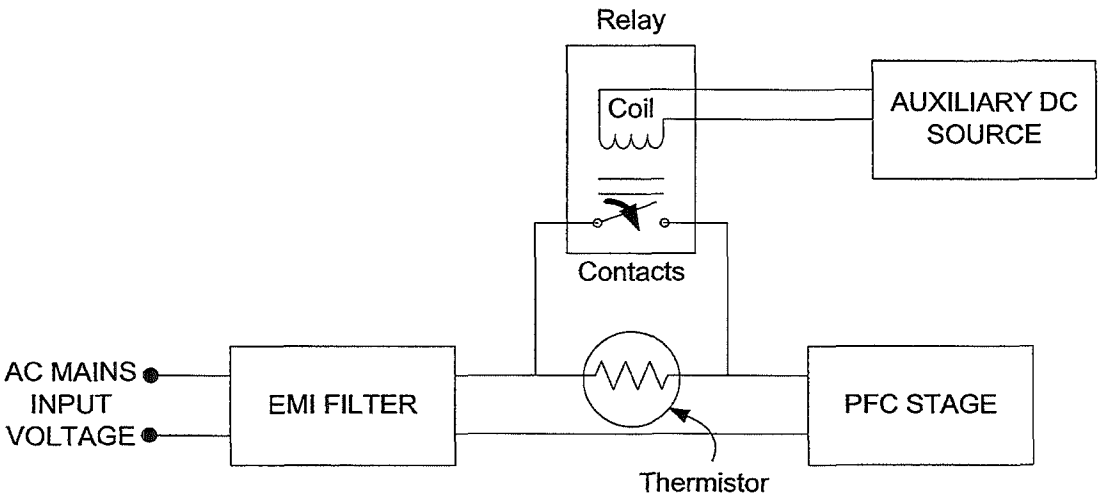
FIGURE 4 (PRIOR ART)
FIG. 4 is a schematic diagram of a prior art inrush current limit circuit.

Turning to FIG. 4, a prior art inrush current limit is shown. In order to limit inrush current limit during initial start up of the power source, one approach is to utilize a negative temperature coefficient thermistor (NTC) in parallel with a relay contact. During initial turn on of the power source, the NTC thermistor limits the inrush current. When the PFC boost stage bulk capacitor is charged, and before the PFC stage is enabled by the primary controller, the primary controller closes the relay contact to bypass the NTC thermistor. This is accomplished by applying a DC voltage via a switch across the coil in the relay.

A limitation of this approach is the power consumption of the relay coil when a continuous DC voltage is applied. This power consumption becomes significant in terms of Energy Star requirements during no load or standby operation such as when a "black out" or minimum light intensity state is received by the communication interface.

Figure 5:
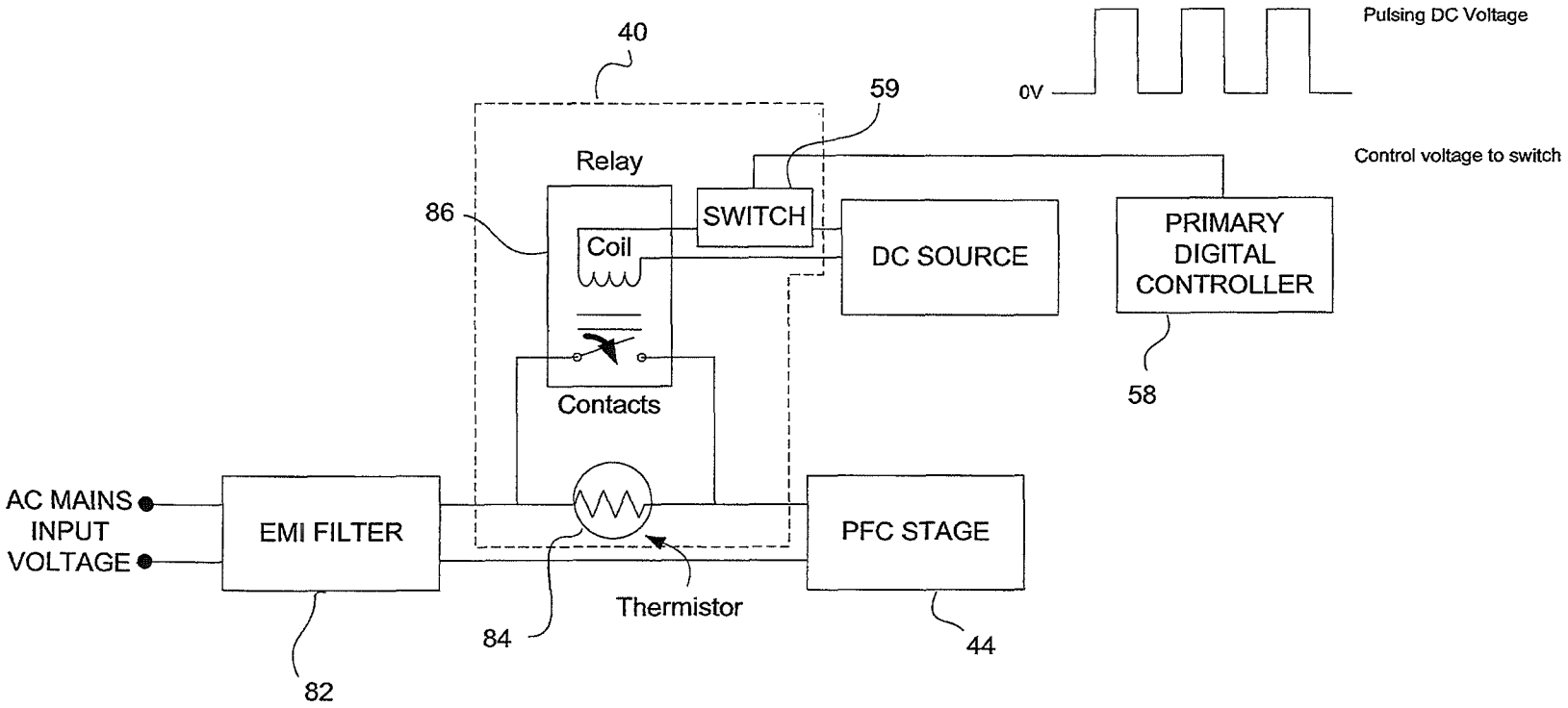
FIG. 5 is a schematic diagram of an embodiment of a novel inrush current limit circuit for use with the configurable LED Driver/dimmer.

Turning to FIG. 5, an embodiment of an improved inrush current limit 40 is shown. An EMI filter 82 is connected between the power supply and the current limit 40 and is connected directly to the PFC boost 44 and via the current limit 40. The current limit 40 includes a thermistor 84, a relay or relay contact 86 and a switch 59. The relay contact 86 is connected in parallel with the thermistor 84. A typical relay coil requires greater energy to close the contacts than is required with the currently described limiter 40 to maintain the contacts in a closed position since less holding force is required. After the relay contacts have been closed by applying a voltage of 12 Vdc, modulation of the relay coil voltage can be initiated by the primary controller 58 to effectively reduce the average voltage across the coil to approximately 5 volts versus a DC voltage of 12V, reducing power consumption. It should be noted that the pulse duty cycle and frequency can also be changed to improve or optimize performance.

In one embodiment, the primary controller 58 pulses the DC voltage across the relay coil via the switch 59 to reduce power consumption.

In one embodiment, for the PFC boost 44, as shown in FIG. 3, the PFC Boost 44 utilizes a boost topology with an input AC voltage mains range of 103 Vac to 300 Vac from the AC supply 42. Energy stored in an inductor within the PFC boost 44 is transferred and stored in the bulk capacitor on a cycle by cycle switching basis at a loosely regulated 430V DC over the input range. The energy is controlled in a manner that forces AC input current to be sinusoidal and in phase with the AC line voltage. By drawing current in phase with the input mains voltage 42, the amount of harmonic currents of the fundamental AC mains frequency being introduced into the power line is reduced.

For the DC/DC convertor 46 and the output voltage bus 48, the preferred embodiment for the DC/DC converter 46 is derived from the isolated buck converter topology and comprises a galvanically isolated full bridge converter employing a primary side phase modulation technique with a secondary side current doubler rectifier circuit.

The full bridge converter parasitic circuit elements in conjunction with primary magnetization current and reflected inductor ripple current cause resonant edge switching transitions on the MOSFET switch thus forcing zero voltage across the MOSFET switching device before turn on. The result is higher efficiency due to the elimination of Coss (drain to source MOSFET Capacitance) switching losses, reduction of gate charge across the Miller capacitance and minimized power loss during switching transitions when voltage and current are changing simultaneously.

Since the output of the DC/DC converter is a tightly regulated DC bus 48, the set of power limit circuits 50 are coupled to either one or more current drivers 52 to limit the power output of each of the output current drivers. 52 The power limit circuits 50 each include a current sensor that is monitored by the secondary controller 64. In the event of a single component failure within the output current driver module, the power limit circuits 50 limit the energy to the loads in accordance with the UL standard 1310 Class 2. Supplementary protection to the power limit circuits can also include one or more fuses.

For the primary digital controller 44, the controller 44 provides digital feedback control for the PFC Boost 44 and DC/DC Converter 46. The digital feedback method for the PFC Boost 44 utilizes average current mode control with duty cycle feed forward for the inner current loop and voltage mode control for the outer control loop. The DC/DC Converter 46 utilizes voltage mode control for the digital control loop.

The primary digital controller 44 also controls the inrush current limit circuit 40, provides primary current limit protection, and over voltage protection for the output of the PFC Boost 44. The primary digital controller 44 also disables the PFC Boost 44 and the DC/DC Converter 46 during black out or no load conditions to reduce power dissipation.

With respect to the output current drivers 52, configuring the required number of outputs and required output current is accomplished by populating the appropriate sections of a single printed circuit board with the appropriate electrical components and programming the output current driver via the in-circuit serial programming (ICSP) ports 54.

Figure 6:
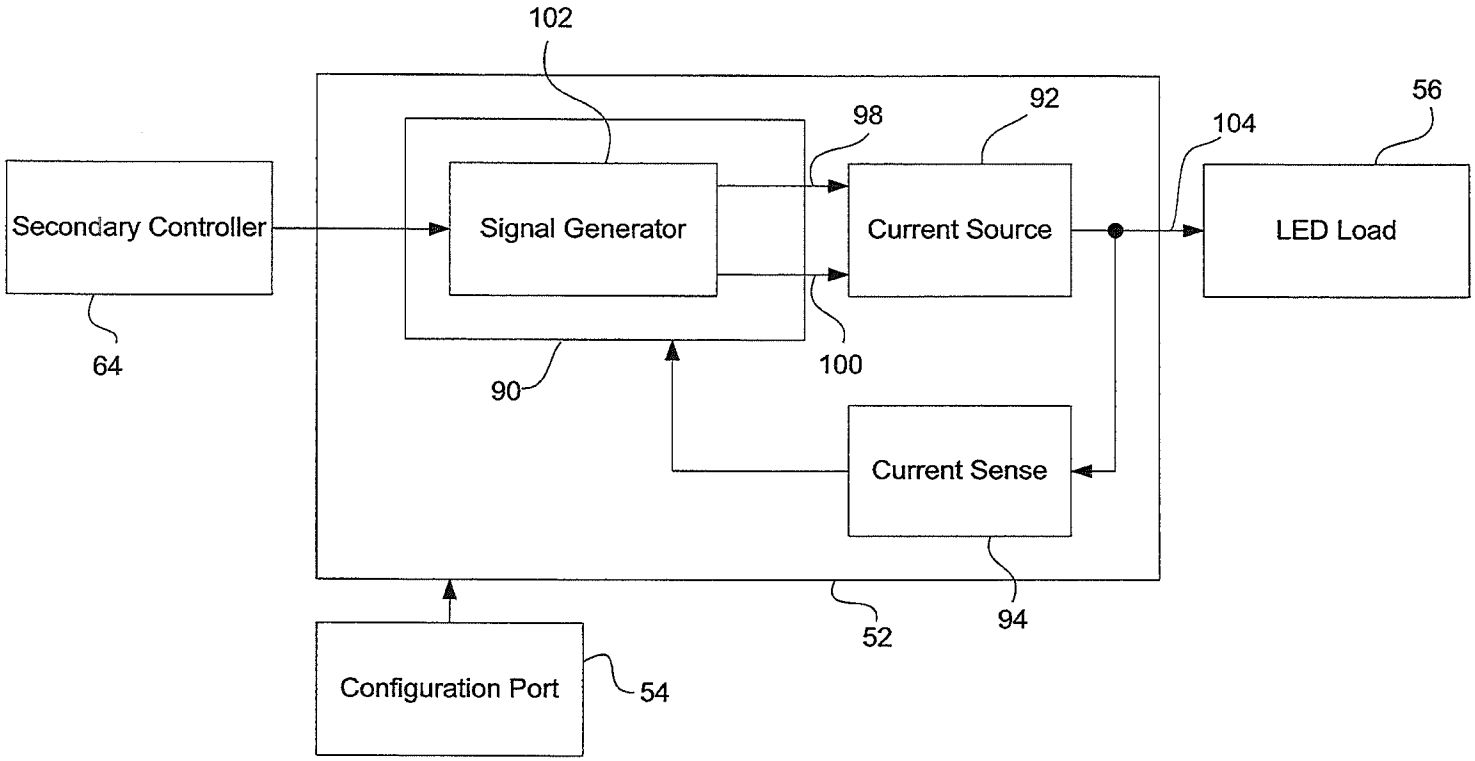
FIG. 6 is a schematic diagram of an embodiment of an output current driver.

Turning to FIG. 6, which is an embodiment of an output current driver, the output current driver 52 comprises a load controller 90, a current source 92, and current sense 94. Although only one current driver 52 is shown, it will be understood that multiple are present as reflected in FIG. 3.

The output current driver may utilize either the dimming/color mixing techniques for LEDs described in detail in US Patent Publication No. 2007/0103086, or the techniques described in detail in International Publication WO2011/140660 which is hereby incorporated by reference.

The secondary controller 64 receives dimming or color mixing information in the form of a serial data stream from the external transmitter 76 via the communication interface 74 and then translates the data stream into LED control information. The LED control information is transmitted to the load controller 90 in the form of instructions to generate a digital signal 98 and an analog signal 100.

The load controller 90 further comprises a signal generator 102 which transmits the digital signal 98 and the analog signal 100 to the current source 92. The digital control signal 98 and the analog signal 100 are preferably generated via a digital control algorithm and 1 Bit algorithm, respectively.

The current source 92 preferably includes ancillary circuitry for operation and comprises a buck topology power stage with hysteretic control. The current sense 94 provides a digital feedback loop for each current source 92. In the preferred embodiment, the current source 92 is a buck circuit topology however other embodiments can include topologies such as boost, buck-boost, or single ended primary inductor converter (SEPIC).

Output 104 of the current driver 52 provides a current pulse via current source 92 to the LED Load 56 whereby on times, off times, and period are not held constant.

Each output current driver 52, has an associated in-circuit serial programming (ICSP) port 54. The ICSP port 54 provides access to the load controller 90 such that firmware updates are possible to permit the configuration of the output current drivers 52. The ICSP port(s) 54 for the output current driver(s) 52 can be located on the printed circuit board assembly of the apparatus or they can be located on the outside of the enclosure.

The configuration options include, but are not limited to, such parameters as the adjustment of the frequency range of the dimming current pulse for the range of light intensity output or the set point adjustment of the peak on time output current.

For example, it might be necessary to increase the frequency range of the dimming current pulse in video recording applications where the dimming current pulse frequency can be programmed for a 2000 Hz to 2500 Hz range. This would negate a visible beat frequency effect that would other wise be noticeable on recorded video. There can be other applications where the adjustment of the dimming current frequency range is required to reduce EMI effects.

The default peak output current set point is programmed via the ICSP port 54 which provides flexibility in the number of possible LEDs types that can be driven and is typically dependent on the recommended operating current specified by the manufacturer such as 350 mA, 700 mA, etc. The set point current is preferably programmed to within 4% of the manufacturer's specification. The peak output current set point can then be precisely calibrated to within typically 1% via the secondary controller 64 during factory calibration.

Figure 7:
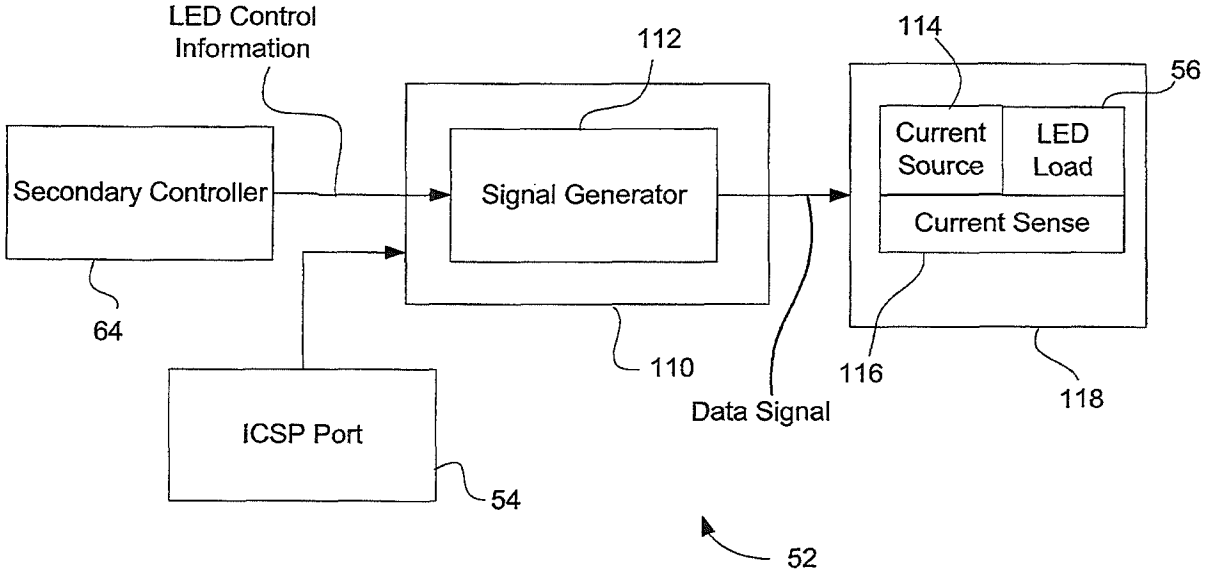
FIG. 7 is a schematic diagram of another embodiment of the output current driver.

An alternate embodiment of an output current driver 52 is shown in FIG. 7. In this embodiment, the output current driver 52 comprises a load controller 110 including a signal generator 112. A current source 114 and a current sense 116 are located within an apparatus 118, such as a light fixture. The light fixture 118 also includes the LED load 56. After receiving the LED control information from the secondary controller 64, the signal generator 112 provides a data signal to the light fixture 118 to operate the LED load 56 via the current source 114 and the current sense 116. This is also schematically shown in FIG. 8.

Figure 8:
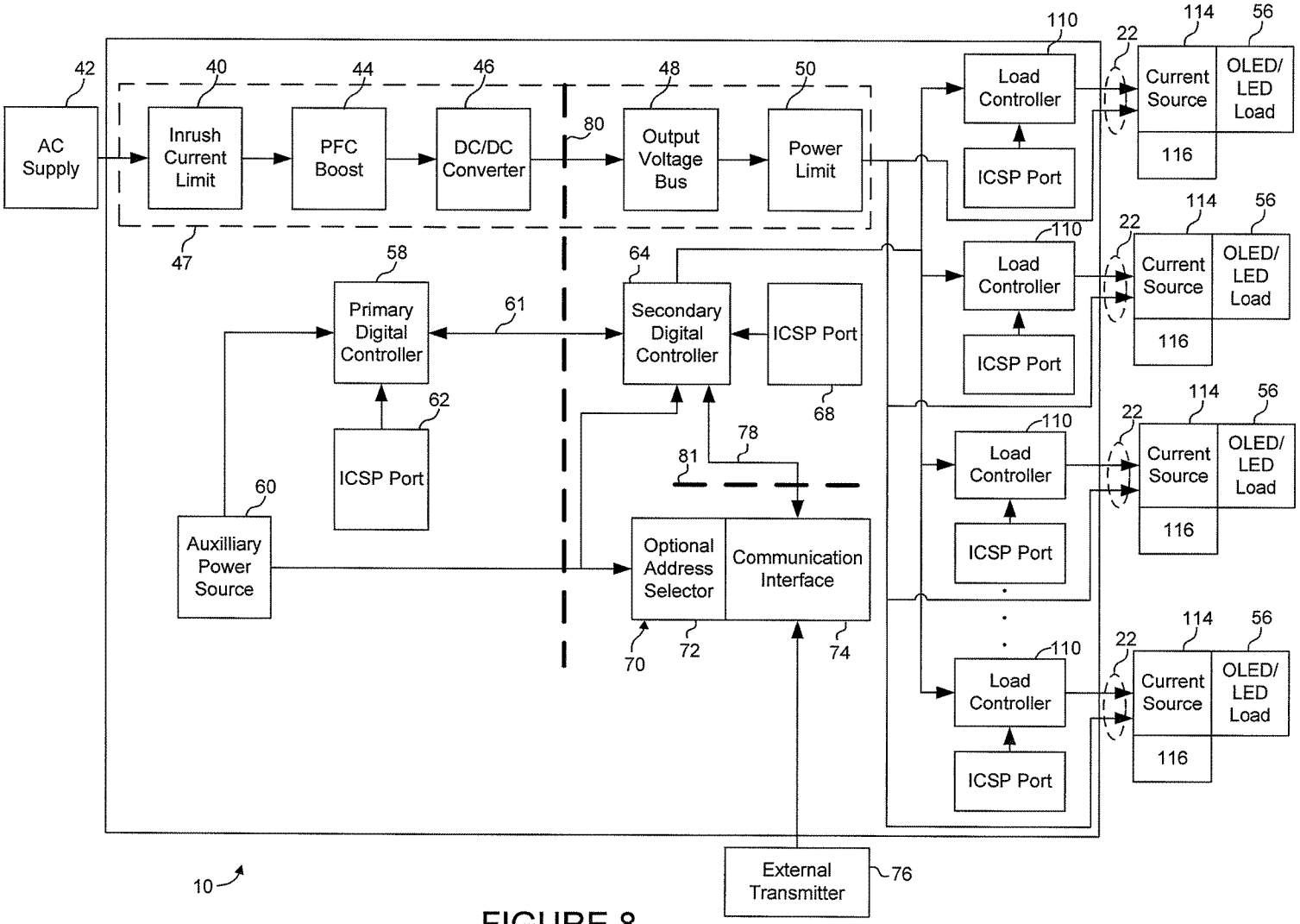
FIG. 8 is a schematic block diagram of another embodiment of the configurable LED Driver/dimmer.

FIG. 8 is a schematic diagram of an alternate embodiment of a configurable LED dimmer 10. As shown, individual current sources 114 and current senses 116 are mounted in the light fixture containing the LED load 56, and power and data signals are provided to each output current source 114 by the multi conductor cable 22. In this embodiment, the current sources 114 are configured to regulate to a predetermined peak current. The load controller 110 transmits the data signal containing the output current information encoded within the three variables of on time, off time, and period whereby no three variables are held constant.

Figure 9:
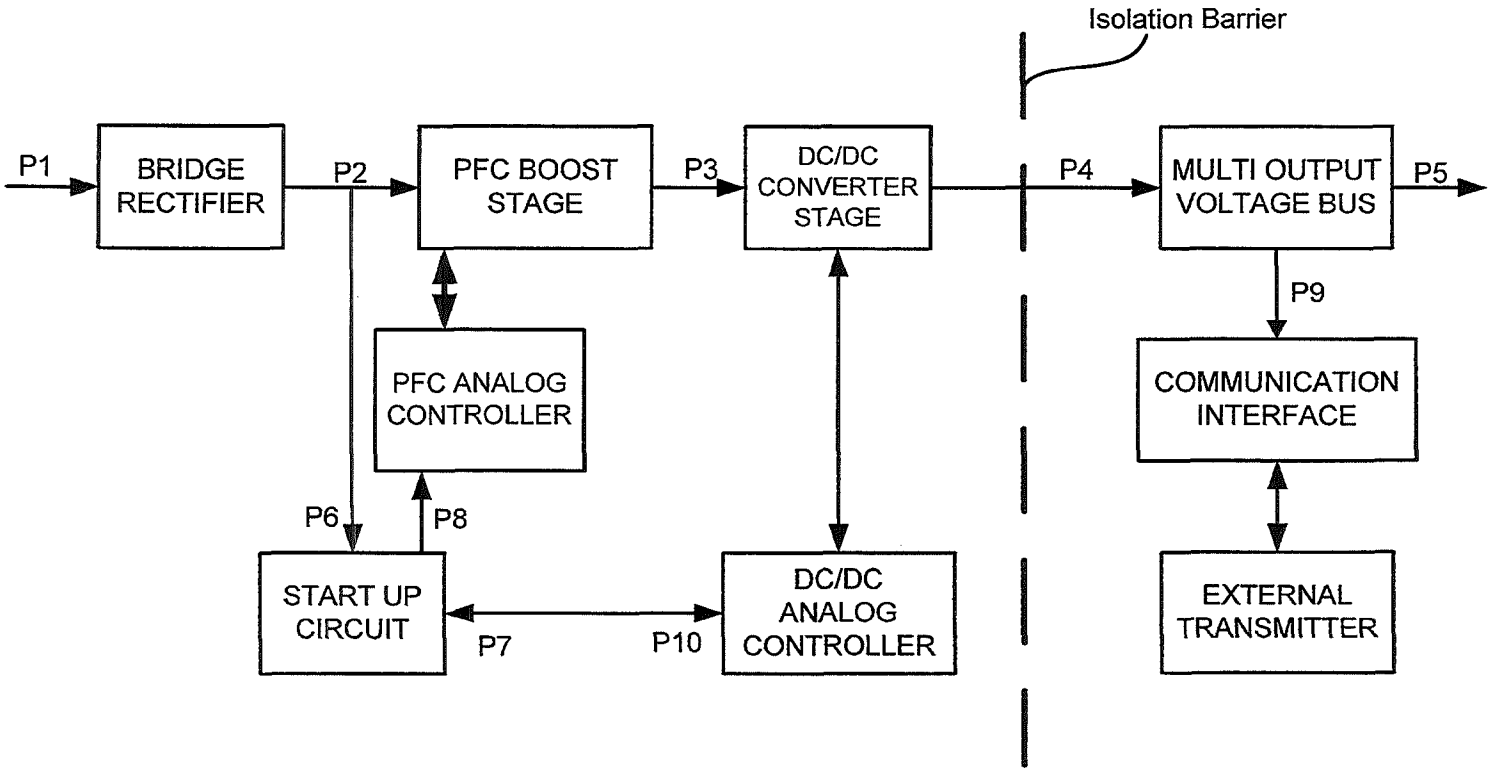
FIGURE 9 (PRIOR ART)
FIG. 9 is a schematic diagram of a prior art multistage power source.

Turning to FIG. 9, a known application of internal auxiliary power requirements in a multistage power source is shown and illustrates how auxiliary power is provided to the various blocks of a multistage power source. P1, P2 . . . P10 represents the various power and voltage transfer requirements for each functional block. For simplicity, the various voltage regulator and filter circuits required for each of the power outputs have been omitted.

In operation, the bridge rectifier converts the AC mains voltage P1 to a rectified voltage P2. A portion of power P6 from the output of the bridge rectifier P2 is supplied to the start up circuit. The start up circuit is comprised of a power transistor or MOSFET and is intended to provide power P8 to the PFC analog controller for only a short duration of a few seconds. Power P8 to the PFC analog controller will allow the PFC Boost stage to begin switching, providing power P10 to the DC/DC controller, and power P3 to the DC/DC converter power stage. Since the start up circuit dissipates an excessive amount of power, it is turned off by the voltage component of P7 supplied by the PFC boost stage. The P7 power is permitted to 'flow through' the start up circuit to continue to supply power P8 to the PFC analog controller.

The output of the DC/DC Analog Converter provides power P4 to the multi output voltage bus, power P9 to the Communication Interface, and the Output Current Drivers by means of P5.

In this implementation, the PFC and DC/DC Controllers are typically analog controllers. It should be noted that in this implementation, in order for the communication interface to continually receive dimming information from an external transmitter, the DC/DC Converter stage must remain turned on. Similarly, in order for the DC/DC converter stage to provide power P4, the PFC Boost stage must remain on.

In a 'black out' state, the communication interface may receive a "0" intensity value out of 255 intensity levels for all of its output current drivers via the external transmitter such as a DMX512A or RDM controller interface, or it may receive an analog voltage of between 0 to 1V via a controller compliant to ESTA E1.3-2001 or IEC60929 as one of many communication interface options. In this 'black out' state, the DC/DC Converter and PFC Boost Stage continue to dissipate an excessive amount of power.

Figure 10:
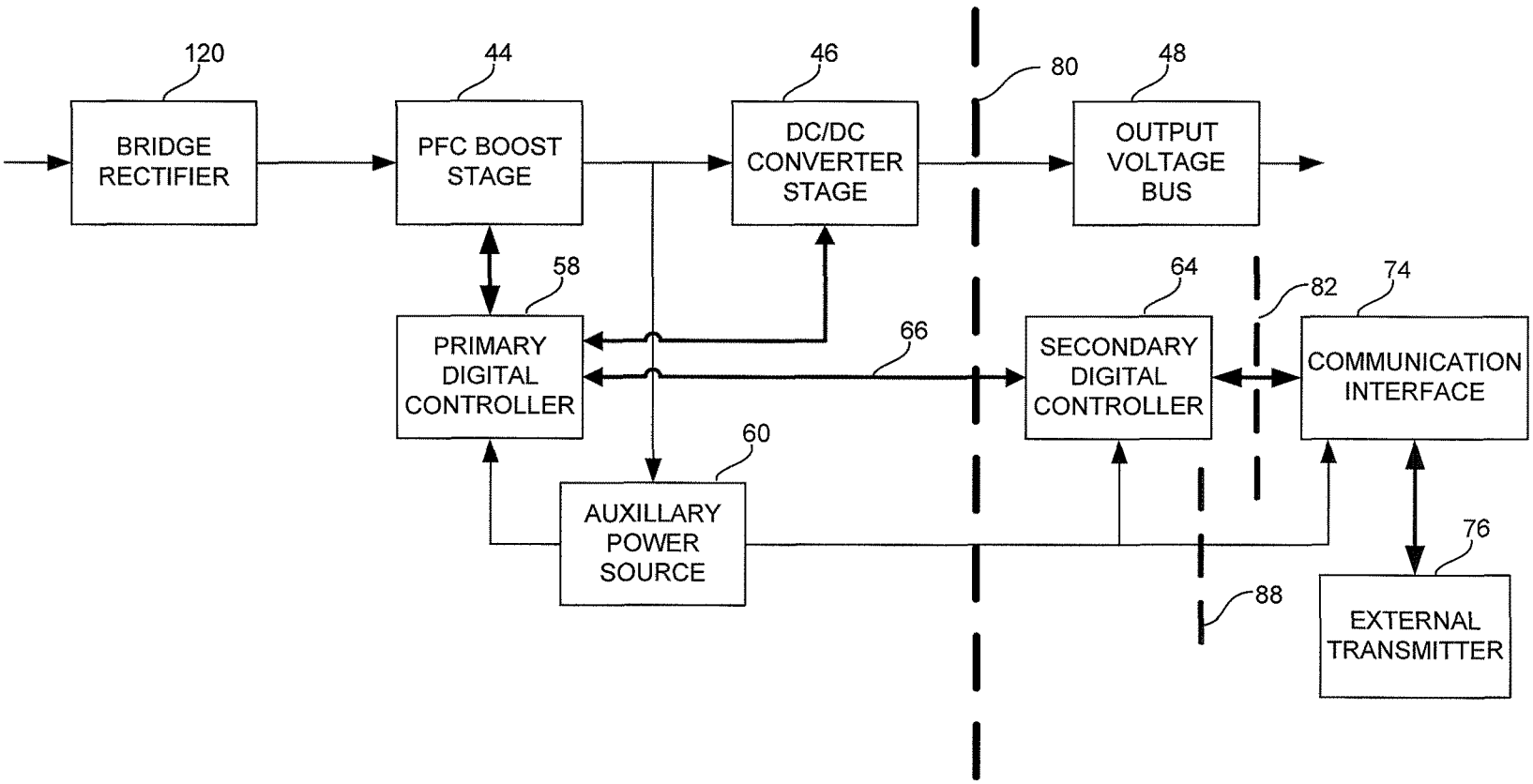
FIG. 10 is a schematic diagram of an embodiment of a novel multistage power source.

FIG. 10 is directed at an embodiment of an improved internal auxiliary power distribution in a multistage power source for providing auxiliary power to the various blocks of a multistage power source. For simplicity, the various voltage regulator and filter circuits required for each of the power outputs have been omitted. The transfer of power from AC mains to the Output Current Drivers (52) is unchanged. This embodiment shows an improved implementation of an independent auxiliary power source providing power to the primary digital controller 58, the secondary digital controller 64, and the communication interface 74. The auxiliary power source 60 comprises an efficient isolated flyback topology with a wide input voltage range and pulse skipping capability to minimize its power dissipation at light loads or no load conditions. In other words power can be provided to the primary digital controller 58, the secondary digital controller 64, and the communication interface 74 via an auxiliary flyback converter.

A 'black out' state received from the external transmitter 76 to the communication interface 74 is communicated to the secondary digital controller 64 and then the primary digital controller 58 via the isolated communication bus 66. The primary digital controller 58 then disables the PFC Boost Stage 44 and DC/DC Converter Stage 46 reducing overall power dissipation of the configurable power source.

It should be noted that even when the PFC Boost 44 is disabled, power can continue to be supplied to the auxiliary power source 60 since rectified voltage from a bridge rectifier 120 can continue to peak charge the PFC boost 44 through an internal capacitor via the boost diode.

The auxiliary power source 60 continues to provide power to the primary digital controller 58, secondary digital controller 64, and communication interface 74 in order to be able to 'listen' for or sense a change in light intensity state that may be communicated by the external transmitter 76.

Alternate embodiments can include additional ancillary circuits that can be powered by the independent auxiliary power source that can be disabled by a controller to reduce over all power dissipation in black out or no load conditions.

With respect to the communication interface 74, the communication interface 74 comprises a removable and interchangeable module with each module adapted for different control options such as DMX512A, RDM, 0-10 Vdc and Zigbee. Operation of the communication interface with such control options will be understood by one skilled in the art.

The communication interface module receives lighting control information via the external transmitter 76 and converts the various protocols into a serial data stream. It then transmits this data by means of a Universal Asynchronous Receiver Transmitter (UART) to the secondary digital controller 64 via the isolated serial communication bus 78. The isolated serial communication bus 78 is comprised of a isolation barrier 82 to "float" the communication interface and prevent ground loops.

Figure 11:
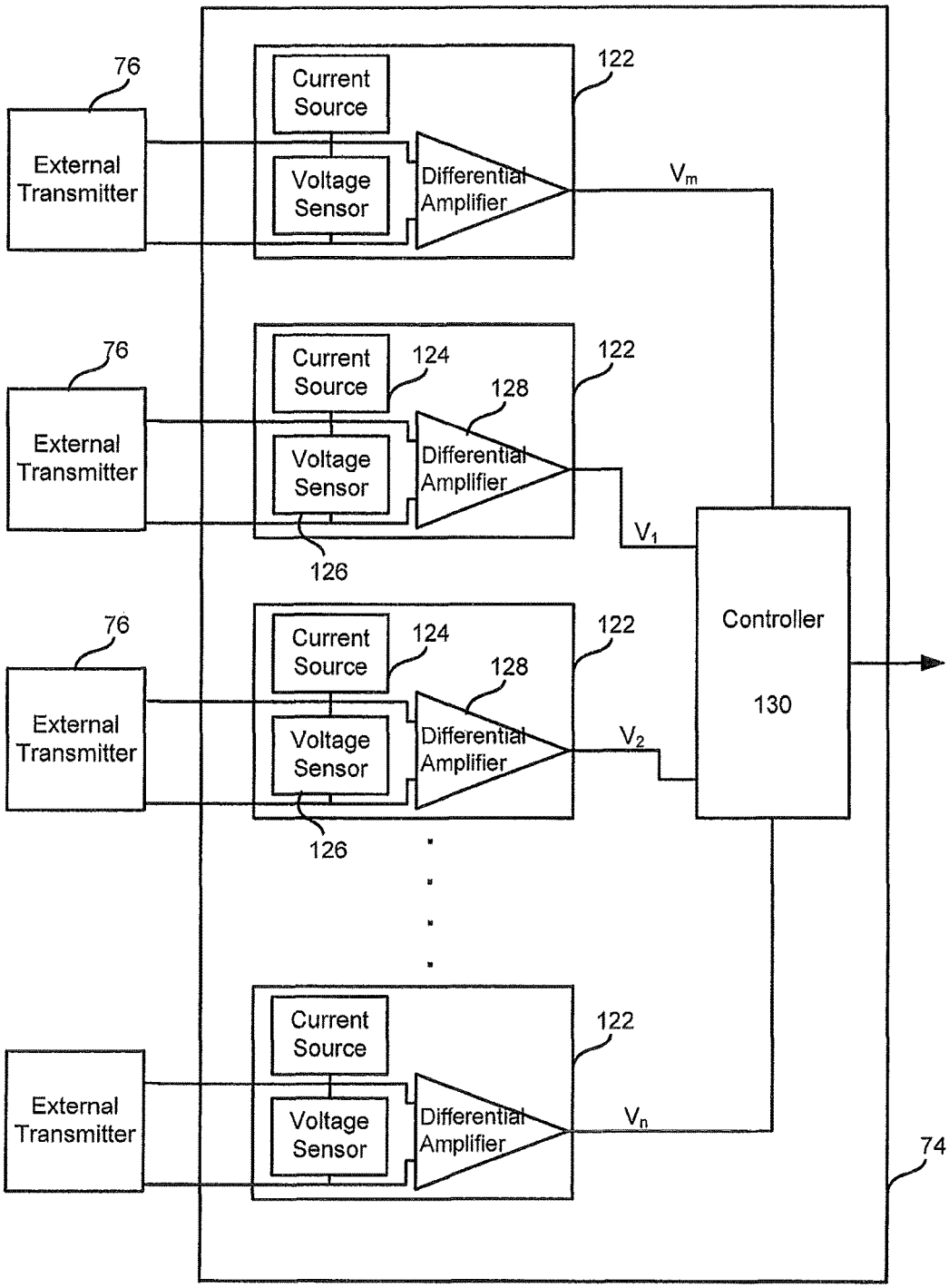
FIG. 11 is a schematic diagram of a communication interface for use with the configurable LED Driver/dimmer.

Turning to FIG. 11, an embodiment of the communication interface is shown. In this embodiment, an analog interface module adapted for 0-10 Vdc IEC60929 or ESTA E1.3-2001 dimming methods as the communication interface 74 is shown. The analog interface module can be adapted to receive one or more analog control voltages from one or more associated external transmitters 76. The external transmitter 76 is preferably an electronic resistor or potentiometer that sinks current from the current source located on the analog interface module and outputs a variable 0-10 Vdc control voltage proportional to the required light intensity.

Individual external transmitters 76 supply signals to various controls 122 within the communication interface 74. Each control 122 is representative of an area or group of LED loads 56. Within each control 122 is a current source 124, a voltage sensor 126 and a differential amplifier 128. The differential amplifier 128 senses a voltage across the voltage sensor 126 and converts this into a correlated voltage (Vm,V1,V2 . . . Vn) supplied to a controller 130. The controller 130 converts this analog voltage into a serial data stream for transmission to the secondary digital controller 64 via the isolated serial communication bus 78.

The communication interface 74 can be configured to have one 0-10 Vdc control voltage simultaneously control via the secondary digital controller 64, all output current drivers 52 and LED loads 56. This application is beneficial in monochromatic color or white lighting applications since only one control signal and associated wiring is required to control multiple light loads.

Furthermore, the communication interface 74 can be adapted to have one or more 0-10 Vdc signal voltages control an associated group of one or more output current drivers in zonal dimming applications. An optional master 0-10 Vdc signal voltage could be able to simultaneously control all of the individual groups of output current drivers.

In applications not requiring the complexity of DMX512A, these analog control options are beneficial in red/green/blue or red/green/blue/amber color changing or monochromatic color or white light applications whereby the addressability and corresponding control of individual LED light loads is not required.

With respect to the secondary digital controller 64, the controller 64 monitors and transmits digital output voltage bus information (feedback loop) via the two way isolated serial communication bus 78, decodes the serial data from the communication interface 74, and transmits control information to the output current drivers 52. As a protection feature, the secondary controller 64 also monitors output currents from the power limit stages 50 supplied to the output current drivers 52

The secondary digital controller 64 includes the ICSP port 68 to program and calibrate the output voltage bus 48 to the required voltage. In DMX512A applications, the ICSP port 68 also allows for the mapping of each of the output channels to a wide variety of addresses. Similarly, in 0-10 Vdc analog control applications, the secondary digital controller ICSP port allows for the mapping of output channels into groups for each associated 0-10 Vdc control signal.

This mapping capability is particularly useful in addressable-networked lighting systems using a DMX512A control protocol where different lighting zones are required to respond to different illumination information. For example, in a 12 channel output configuration, the first 6 channels could be mapped to the DMX base address of the power source (i.e. DMX01) and the last 6 channels could be mapped to DMX address +1 (i.e. DMX02).

This mapping capability is also useful in zone dimming applications using 0-10 Vdc analog controls as the communication interface. For example, a 12 channel output LED dimmer configuration can have 7 output channels grouped for a first associated 0-10 Vdc signal, the next 3 channels can be grouped to a second associated 0-10 Vdc control signal, and the last 2 channels can be grouped to a third associated control signal.

Figure 12:
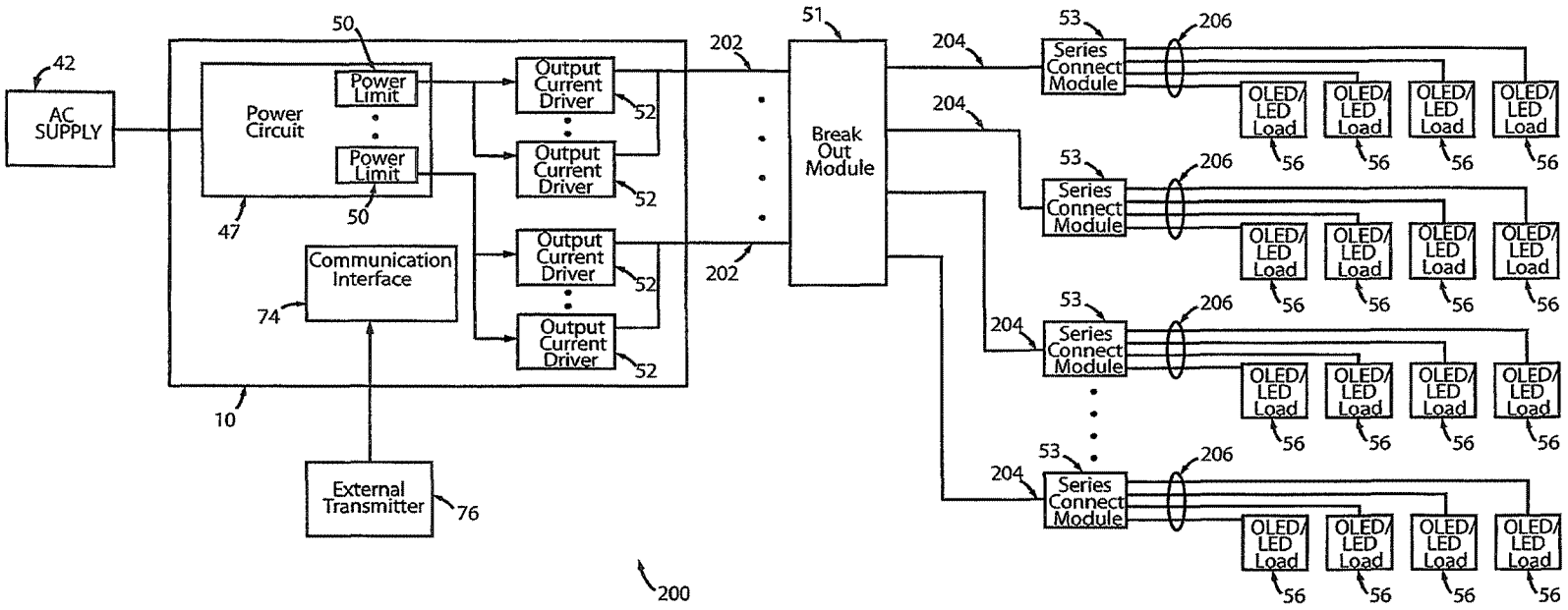
FIG. 12 is a block diagram of an embodiment of a configurable LED Driver/Dimmer implemented in a low voltage DC distribution LED lighting system.

Turning to FIG. 12, a block diagram of an embodiment of a configurable LED dimmer implemented in a low voltage DC distribution LED lighting system is shown. For reference, a low voltage DC distribution system is defined as a system where all power from the Configurable LED dimmer provided to the LED loads meets Class 2 requirements as defined in UL1310 Class 2 Power Units and NEC (National Electrical Code) Article 725 for Class 2 Power Limited Circuits.

The low voltage DC distribution LED lighting system 200 includes a LED dimmer 10, which receives power from an AC supply 42, and is connected to at least one breakout module 51 which in turn is connected to a set of series connect modules 53 by means of communications cabling 204. Similarly, the series connect modules are connected to individual Organic Light Emitting Diodes (OLED)/Light Emitting Diodes (LED) loads 56, or LED loads, via communications cabling 206.

Referring to the LED dimmer 10, an example of which was previously described with respect to FIG. 3, the power circuit 47 comprises a DC to DC converter 46 and a power limit or power limit function 50. The DC to DC power converter may be an isolated full bridge converter or an isolated half bridge LLC resonant converter. Although only one power limit is shown, there may be multiple power limits whereby each power limit is connected to a set of output current drivers 52 to limit the power output supplied to the set of output current drivers.

The power limit 50 may be a fuse, a resettable fuse or an electronic circuit that includes a current sense. The power limit may also include any ancillary circuits or components that limit power to the output current drivers or shut off the LED dimmer 10 or both.

The power limit circuit 50 limits the amount of power supplied to a set of output current drivers under normal operation of each. Similarly, in the event of a single component failure within any output current driver 52 within the set, the power limit 50 may also limit the power to the set of current drivers 52. In one embodiment, the power is limited to less than 100 watts in accordance with UL standard 1310, Class 2 Power Units. The set of output current drivers 52 includes a quantity of output drivers such that the total output power of the set of output drivers does not exceed 100 watts under normal operating conditions.

Each set of output current drivers 52 is connected to the breakout module 51 by means of communications cabling 202.

With respect to the communication interface 74, the communication interface 74 comprises a removable and interchangeable module with each module adapted for different control options such as DMX512A, RDM (Remote Device Management), 0-10 Vdc analog control, Zigbee, and DALI (Digital Addressable Lighting Interface). DALI requirements are defined in standards IEC 62386-101; System General Requirements, IEC 62386-102; General Requirements-Control Gear, and IEC 62386-207; Particular Requirements for Control Gear-LED Modules. The communication interface module receives lighting control information via the external transmitter 76 and converts the information regardless of the various protocols into a serial data stream for use by the dimmer 10.

As shown in FIG. 12, the output current drivers or the set of output current drivers 52 are connected via the cabling 202, 204, 206, directly or indirectly, to breakout modules 51, and series connect modules 53 to the LED loads 56, and such connectivity may be referred to as individual channels or a set of channels respectively. In one embodiment, the cabling, communications cabling has an overall insulation sheath and may be shielded or unshielded. It is available in either insulated multi-conductor or insulated twisted pair stranded wiring and the wire gauge is typically 18 AWG. Alternate cabling options may also include 20 AWG or 22 AWG and type PLTC (power limited tray cable), CL2 (Class 2) or CL3 (Class 3) as permitted in Article 725 of the NEC.

The LED dimmer 10, via the output current drivers 52, connects into at least one breakout module 51 via the cabling 202 as a set of output channels. The breakout module 51 then splits the set of channels into individual channels or into a predetermined number of channels depending on the required configuration of the lighting system.

For example, a connection from the LED dimmer 10 may have four (4) individual cables 202 connected to the breakout module 51, each cable further comprising six (6) conductors or three (3) twisted pairs for connection (positive and negative) of 3 channels per cable. This represents a feed in of 12 channels in 4 groups of 3 into the breakout module 51. The breakout module 51 regroups the channels into groups of 2 for connection to the series connect module 53 using communications cabling 204 with 4 conductors or 2 twisted pairs of conductors. This may be seen as the output of the breakout module 51 and represents a feed out of 12 channels with 6 groups of 2 channels. In other embodiments, there are a number of other feed in cable and feed out cable combinations possible for the break out module 51.

The series connect modules 53 connect multiple LED loads 56, in series for every channel. In one embodiment, the series connect module 53 receives a four (4) conductor cable 204 feed in (representing 2 channels) and then electrically connects, via cabling 206, at least 2 LED loads 56 in series for each channel. The cabling 204 is typically a 4 conductor or 2 twisted pair configuration.

A number of different LED load 56 configurations are possible. Typically, the LED loads 56 are part of a light fixture and comprise one or more LED arrays or a group of individual LEDs. The LEDs are typically mounted on a suitable heat sink and installed in various types of housings. Such housings or configurations may include recessed cans with an associated electrical junction box, pendants, rail systems or track systems. A rail fixture includes fixed location LED sources mounted on a linear rail and a track system includes moveable LED light sources mounted on a track system. In one embodiment, the LED loads 56 may have a lumen output of up to 1200 lumens. It is of course possible to have loads with a higher or lower lumen output.

The LED dimmer 10 may be remotely mounted from the LED loads and in some cases may be up to 200 feet from the LED loads. Alternate distances between the LED dimmer and the LED load are also possible and dependent on the forward voltage drops in the LED loads and the voltage drops dependent on the wire gauge of the communications cabling.

Figure 13A:
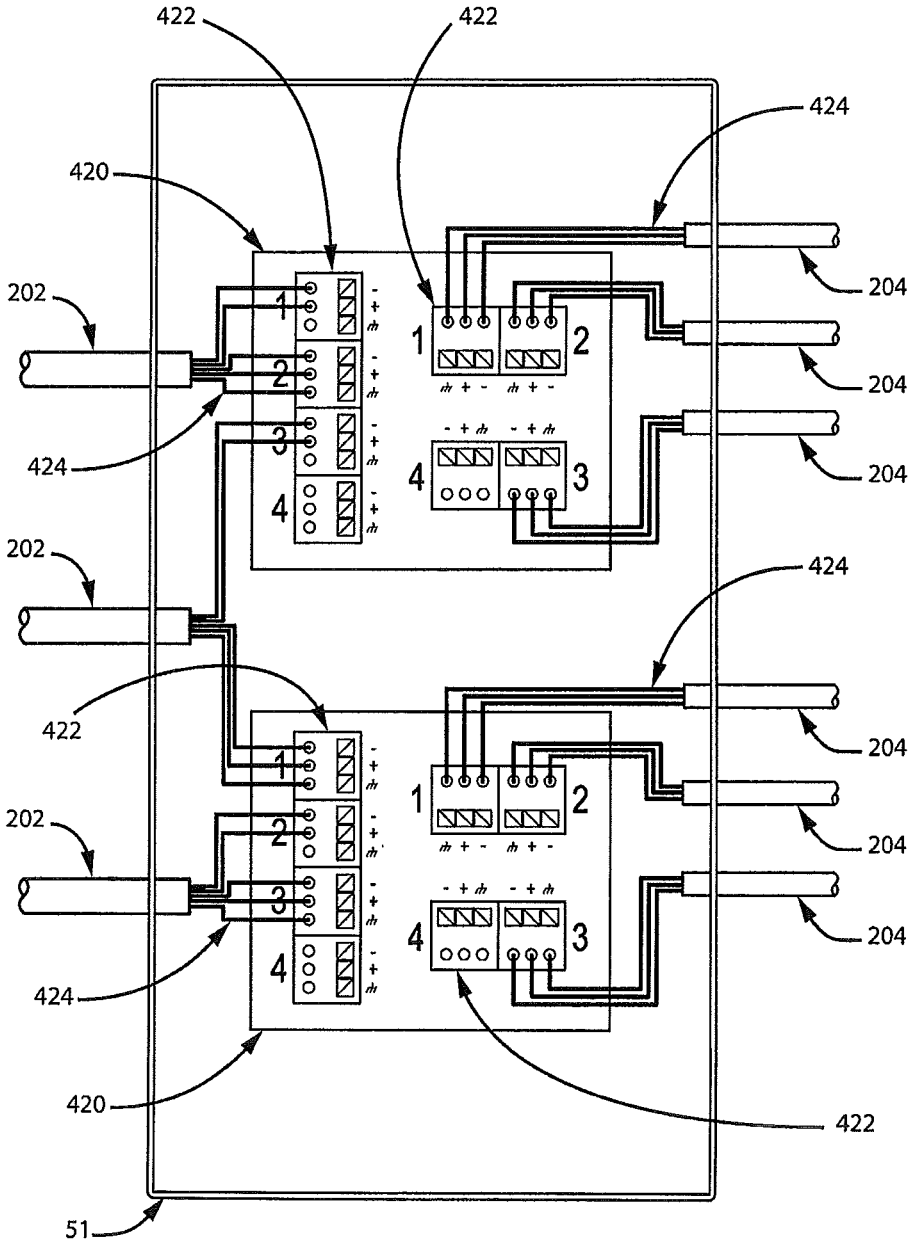
FIG. 13a is a diagram of one implementation of a break out module.

FIG. 13a is a diagram of one implementation of the break out module 51. The break out module 51 comprises two printed circuit board (PCB) assemblies 420 with modular power connectors 422 arranged as terminal blocks to provide an electrical connection between the feed in channels and the feed out channels which are seen as cabling 204.

The break out module 51 regroups or separates the feed in channels with a different grouping of feed out channels. It may also provide visual means for an installer to easily organize and keep track of the grouping and arrangement of channels during installation.

In this embodiment, the feed in includes 6 channels of 3 cables 202 with each cable providing 2 channels. The feed out comprises 6 channels of 6 cables 204 with each cable providing one channel. The cabling includes an optional shield wire 424 for connection to the system ground. Other implementations are contemplated.

The power connectors 422 preferably include apparatuses to enable a method of quickly inserting or releasing the cabling by means of a tool or push button on the connector (s). The connectors 422 may be either cage clamp or push wire type connectors.

Figure 13B:
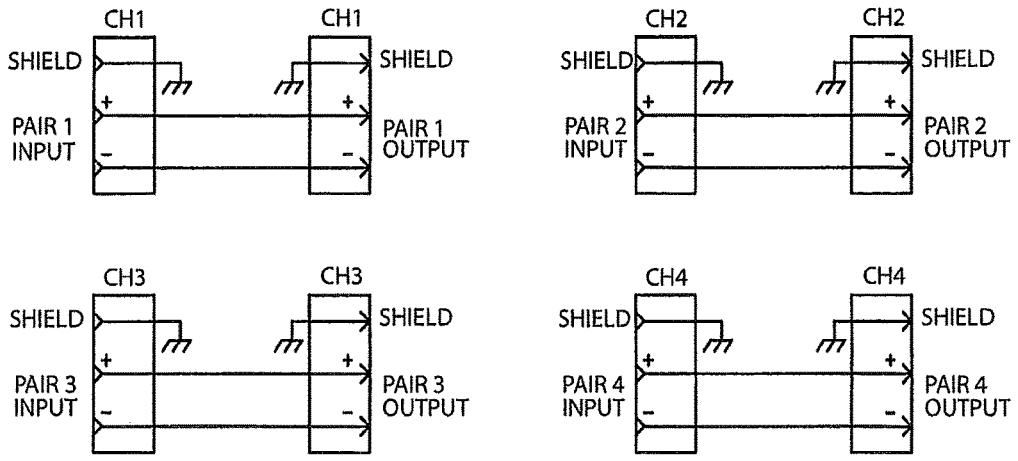
FIG. 13b is a schematic diagram of one implementation of a break out module.

FIG. 13b shows a schematic representation of the break out module 51 of FIG. 13a.

Figure 14A:
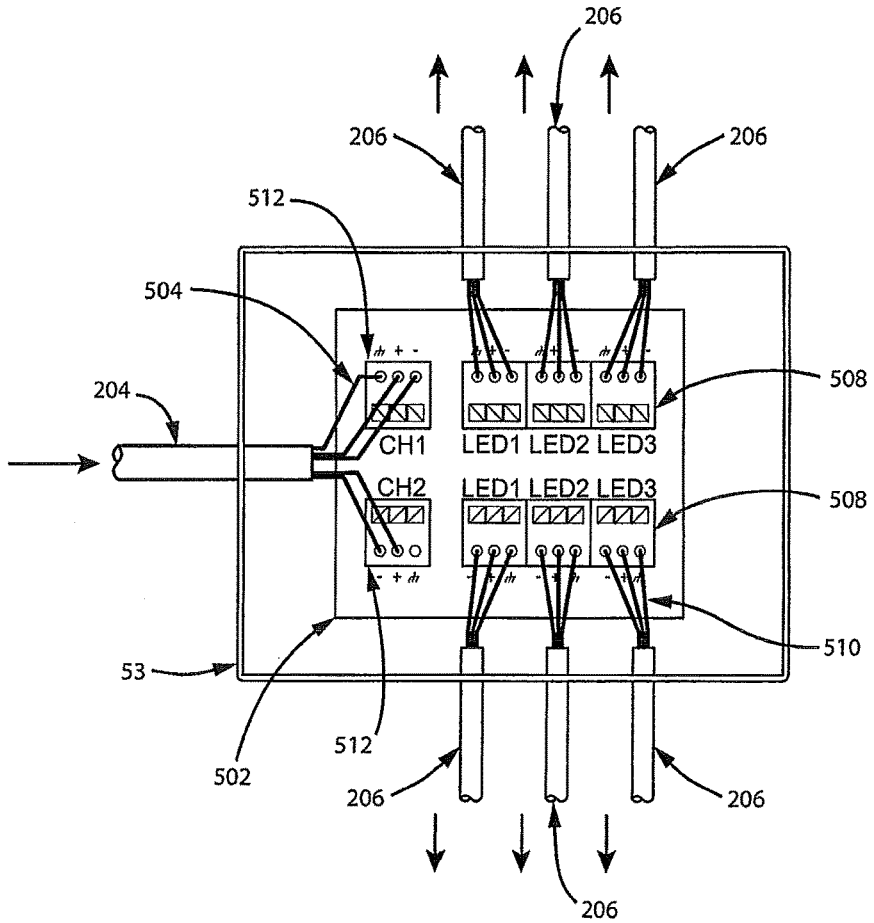
FIG. 14a is a diagram of an embodiment of a series connect module.
Figure 14B:
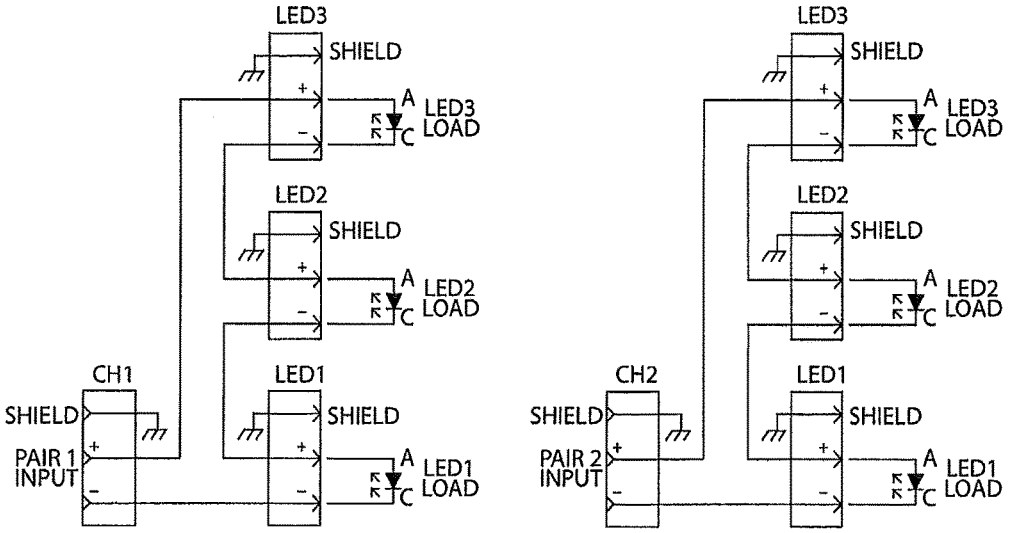
FIG. 14b is a schematic diagram of a series connect module.

With reference to FIG. 14a, a diagram of an embodiment of a series connect module 53 is shown. The series connect module 53 contains at least one PCB assembly 502 with feed in modular power connectors 512 for electrical connection of the feed in cable seen as cabling 204. The feed in cable 204 comprises 4 conductors or 2 pairs representing 2 channels (CH1 and CH2) with an optional shield connection 504. The feed out modular connectors 508 are connected in series on the PCB assembly 502 in order to connect the LED loads 56 in series via feed out cables 206 as shown schematically in FIG. 14b. The feed out cables 206 may be comprised of one pair of two conductors and an optional shield connection 510 to the system ground.

The power connectors 508, 512, preferably include apparatuses to enable a method of quickly inserting or releasing the cabling by means of a tool or push button on the connector. The connectors may be either cage clamp or push wire type connectors.

It is understood that many other embodiments are possible for the series connect module 53 whereby there may be multiple feed in cables where each feed in cable may comprise any number of channels. The series connection of LED loads 56 may also include any number greater than two.

Figure 15:
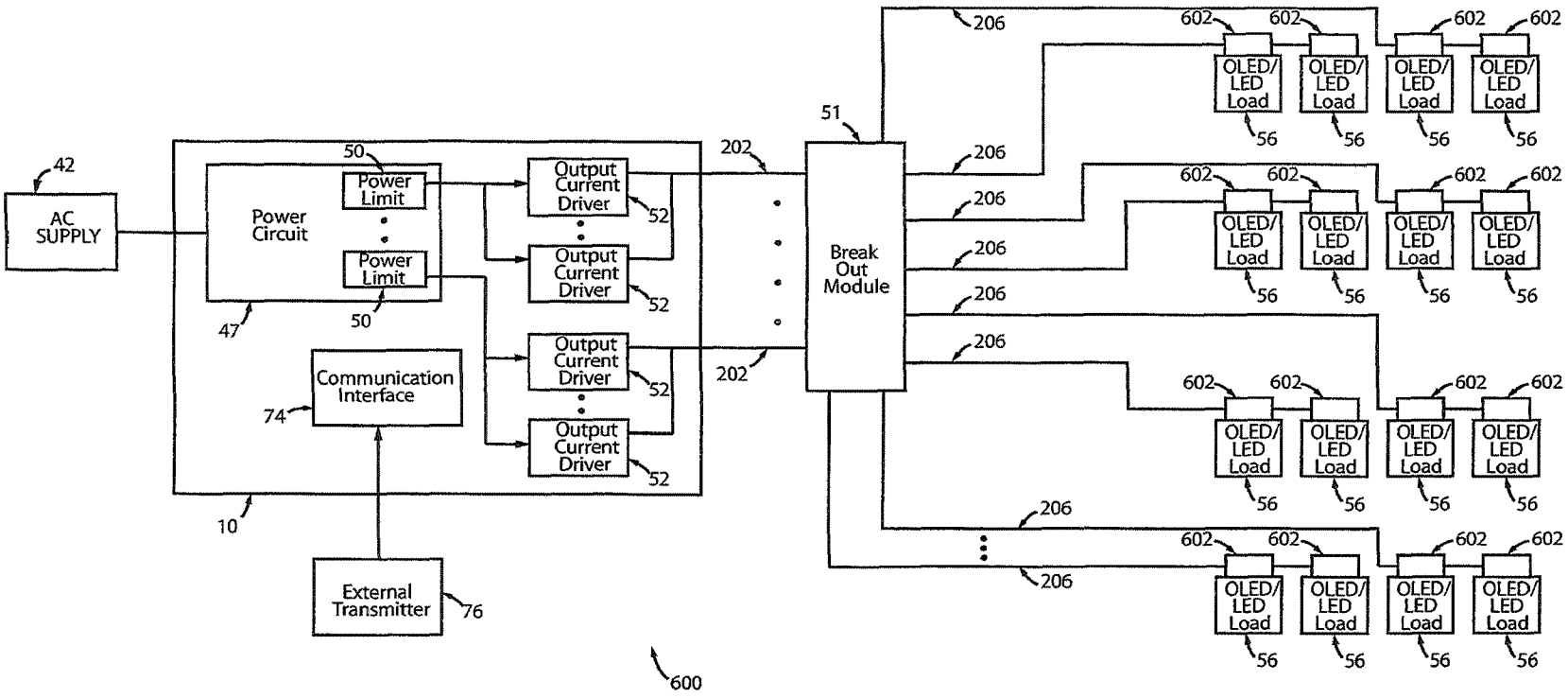
FIG. 15 is a block diagram of an embodiment of a configurable LED Driver/dimmer implemented in a low voltage DC distribution LED lighting system.

Turning to FIG. 15, a block diagram of another embodiment of a configurable dimmer implemented in a low voltage DC distribution LED lighting system is shown. In this embodiment, the series connect module is excluded from the low voltage DC distribution LED lighting system 600. The series connect means is completed within an electrical junction box 602 associated with each LED load 56. As before, the system 600 includes a dimmer 10 connected to a break out module 51 via cabling 202 and 204. The typical number of LED loads connected in series is two, and twist-on wire connectors are used to make the electrical series connections between the LED loads 56 and the cable 206.

Figure 16:
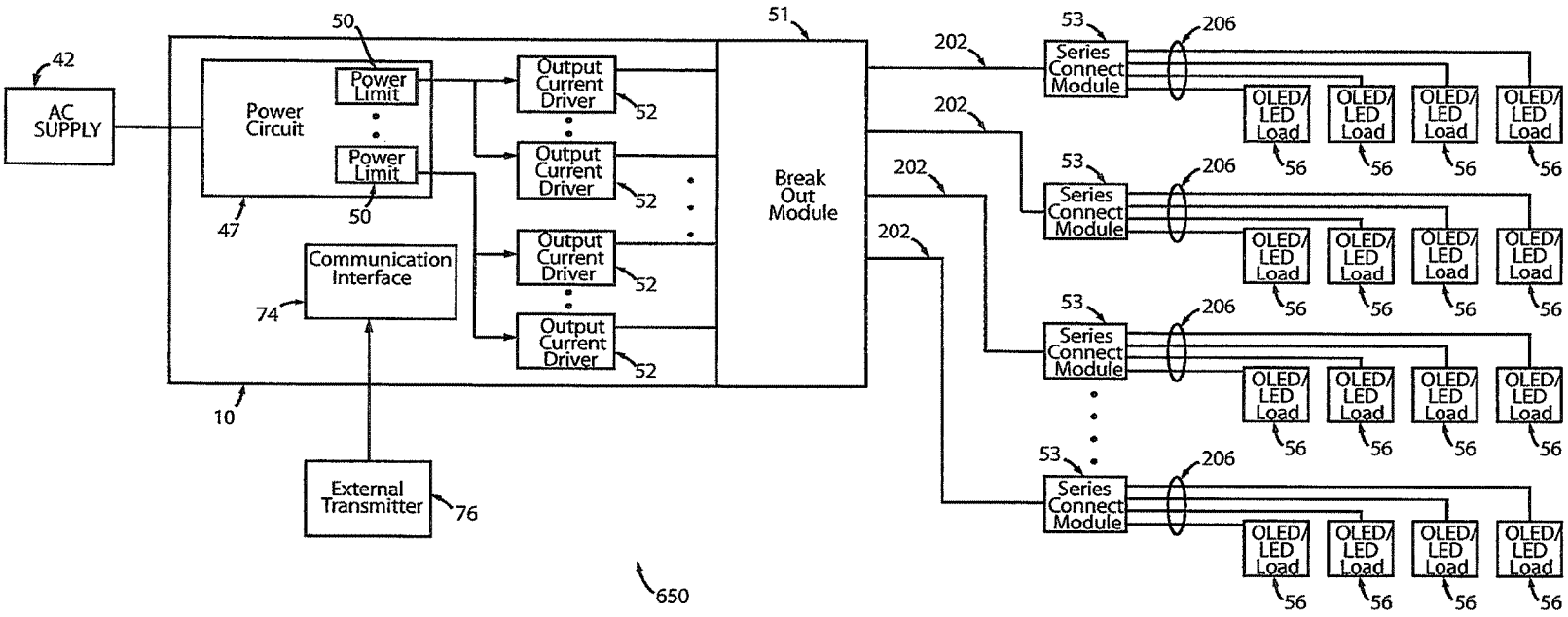
FIG. 16 is a block diagram of an embodiment of a configurable LED Driver/dimmer implemented in a low voltage DC distribution LED lighting system.

With reference to FIG. 16, a block diagram of an alternate embodiment of a configurable dimmer implemented in a low voltage DC distribution LED lighting system is shown. This embodiment shows the break out module 51 as an integral part of the LED dimmer 10 within the system 650.

Figure 17:
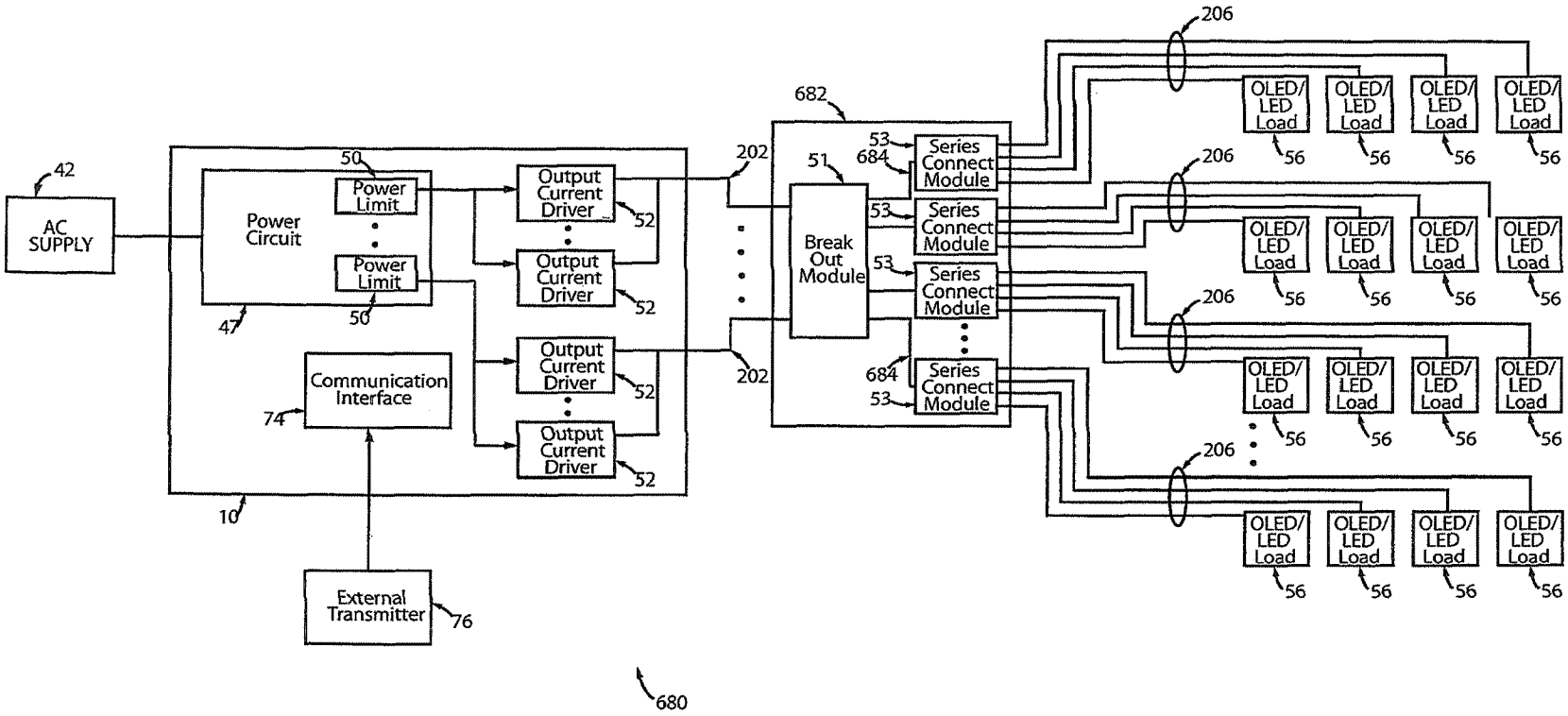
FIG. 17 is a block diagram of an embodiment of a configurable LED Driver/dimmer implemented in a low voltage DC distribution LED lighting system.

Turning to FIG. 17, a block diagram of a further embodiment of a configurable dimmer implemented in a low voltage DC distribution LED lighting system is shown. In this embodiment of the system 680, the break out module 51 and the series connect modules 53 are integrated into a single enclosure or module 682. The electrical connection 684 between the break out module 51 and the series connect modules 53 may be accomplished by means such as cabling, hook up wire, or PCB (printed circuit board) copper tracks.

Figure 18A:
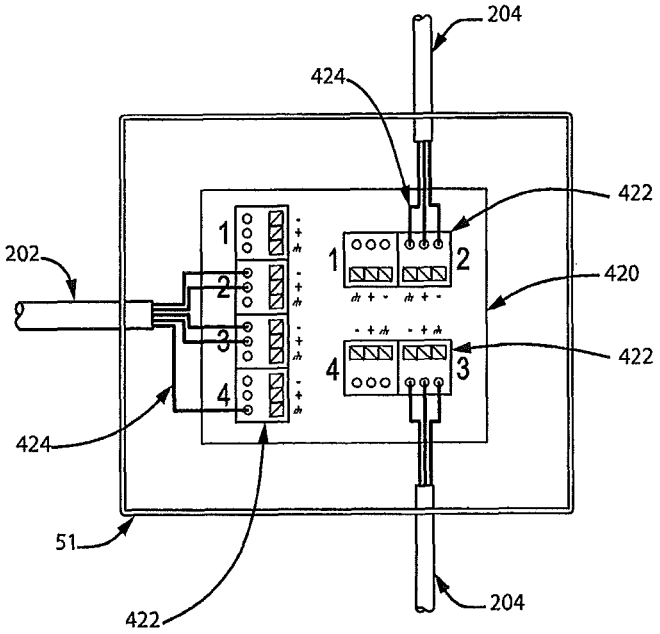
FIGS. 18a, 18b, and 18c are diagrams of embodiments of a break out module.
Figure 18B:
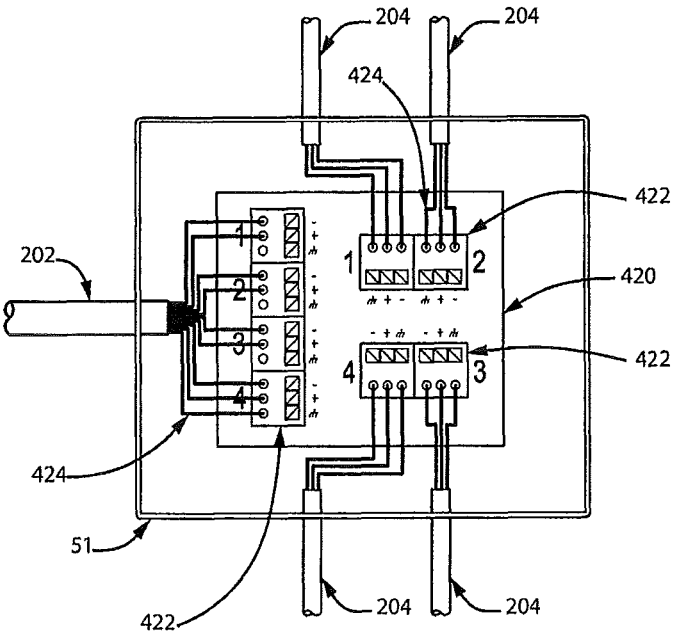
Figure 18C:
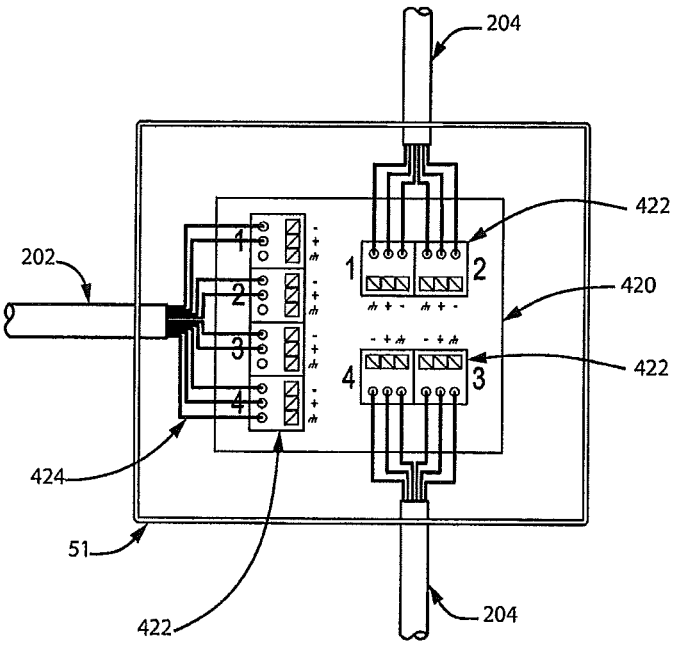

Turning to FIGS. 18a, 18b, and 18c, alternate embodiments of the break out module are shown. All configurations include modular power connectors 422 arranged as terminal blocks and mounted on a PCB 420 to provide an electrical connection between the feed in channels and the feed out channels. The connectors include apparatus to allow for a quick means to insert or release the wiring by means of a tool or push button on the connector.

In FIG. 18a one feed in cable 202, comprises conductors for 2 channels and an optional shield wire connection 424. The feed out includes 2 cables 204 each with 2 conductors for one channel and an optional shield wire connection 424.

In FIG. 18b, one feed in cable 202, comprises conductors for 4 channels and an optional shield wire connection. The feed out includes 4 cables 204, each with 2 conductors representing one channel and an optional shield wire connection 424.

In FIG. 18c, one feed in cable 202, comprises conductors for 4 channels and an optional shield wire connection. The feed out includes 2 cables 204, each with 4 conductors representing two channels and an optional shield wire connection 424.

Figure 19:
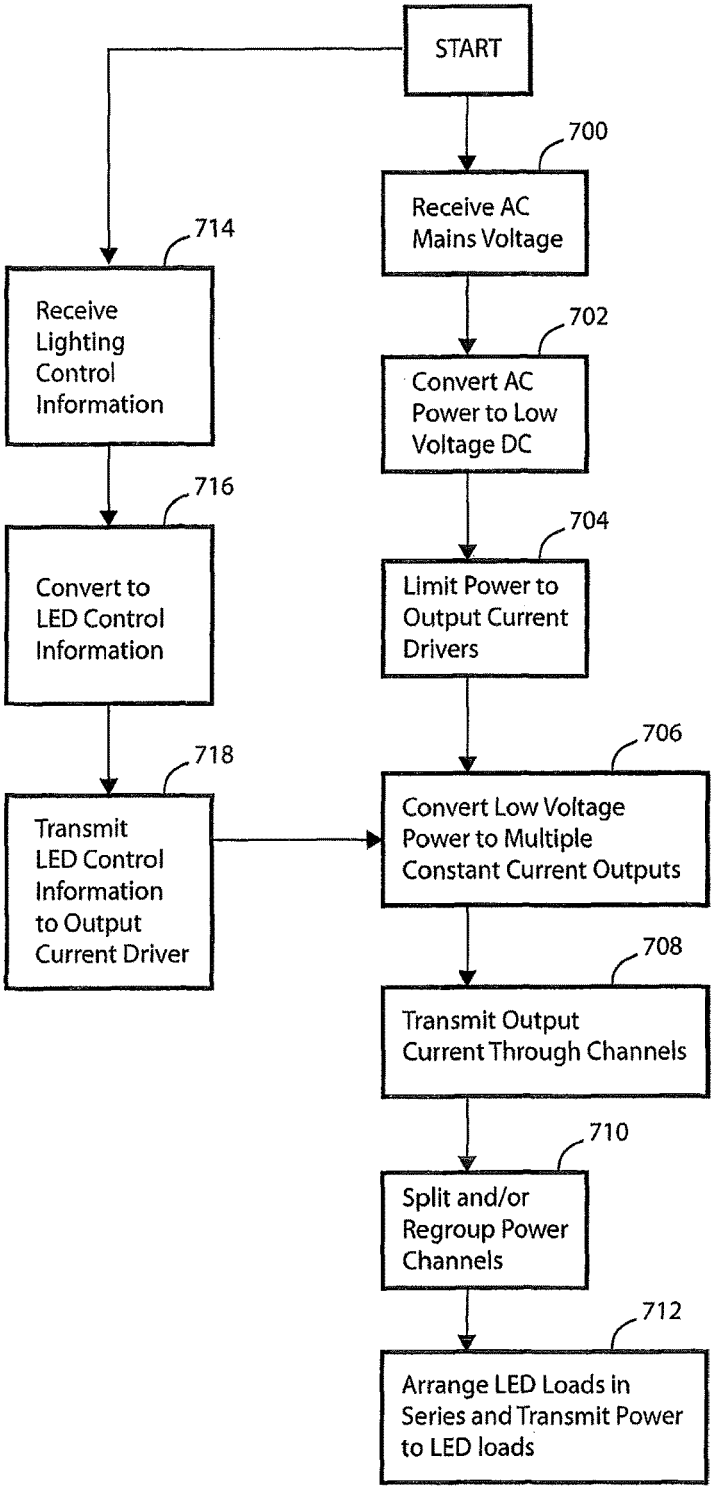
FIG. 19 is a flowchart of a method of providing low voltage power to a set of LED loads.

Turning to FIG. 19, a method of providing low voltage power to a set of LED loads is shown. In operation, an AC voltage 700 is applied to the power circuit of the LED dimmer and converted to low voltage DC 702. The low voltage DC bus is then power limited 704 by at least one power limit circuit or like components to less than 100 watts in accordance with UL1310 Class 2 characteristics.

The low voltage DC power is the converted to multiple constant current outputs 706 via the power limit such as by means of the output current drivers which generate a constant peak current for each output channel.

The power is then transmitted in the form of low voltage and pulsed current on each channel 708 to the breakout module via the cabling connecting the dimmer and the breakout module. The breakout module splits or regroups, or both, the power channels 710 and transmits the power to the series connect modules. The series connect module provides power for each channel to multiple LED loads connected in series 712 by means of cabling.

FIG. 19 also shows a method for control of the LED dimmer. Lighting control information such as dimming intensity levels in the form of various protocols is transmitted by an external transmitter into the communication interface 714 of the LED dimmer. The various protocols are converted to a data stream, preferably serial, and transmitted to the secondary digital controller which in turn translates the data stream into LED control information 716.

The LED control information, which in one embodiment is in the form of a digital and analog signal, is transmitted to the controllers of the associated output current drivers 718.

The output current drivers generate power as pulsed current at low voltages based on the dimming intensity levels received as lighting control information for each channel of the low voltage lighting system.

Embodiments of the disclosure can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described disclosure can also be stored on the machine-readable medium. Software running from the machine-readable medium can interface with circuitry to perform the described tasks.

The above-described embodiments of the disclosure are intended to be examples only. Alterations, modifications and variations can be effected to the particular embodiments by those of skill in the art without departing from the scope of the disclosure, which is defined solely by the claims appended hereto.

What is claimed is:

[1. A configurable light emitting diode (LED) driver/dimmer for controlling a set of light fixture loads comprising:

a power circuit including:

an inrush current limit;

a DC/DC converter;

a power factor correction (PFC) boost connected to the inrush current limit and the DC/DC converter;

a regulated output voltage bus connected to the DC/DC converter; and a primary controller for controlling the power circuit;

a set of output current drivers, each of the set of output current drivers connected to one of the set of light fixture loads for controlling the associated light fixture load; and at least one power limit associated with the set of output current drivers;

a secondary controller for controlling the set of output current drivers;

wherein the secondary controller transmits LED control information to control outputs of the set of output current drivers; and wherein the secondary controller receives a program comprising an algorithm for converting an input signal to the LED control information and establishes a conversion between the input signal and the LED control information based on the algorithm.]

[2. The LED driver/dimmer of claim 1 further comprising:

a programming port associated with the secondary controller for configuring the LED driver/dimmer.]

[3. The LED driver/dimmer of claim 1 further comprising a communication interface for receiving data from an external transmitter and for transmitting the data to the secondary controller wherein the data is a communication protocol.]

[4. The LED driver/dimmer of claim 3 further comprising an isolation barrier for separating the secondary controller and the communication interface.]

[5. The LED driver/dimmer of claim 3 wherein the communication interface is either DMX512A, 0-10 Vdc analog control, Zigbee wireless or Remote Device Management (RDM) compatible.]

[6. The LED driver/dimmer of claim 3 further comprising an auxiliary flyback converter to provide power to the primary controller, secondary controller, and communication interface.]

[7. The LED driver/dimmer of claim 1 wherein the algorithm is based on one or more parameters of at least one of the power circuit, the set of light fixture loads or the set of output current drivers.]

[8. The LED driver/dimmer of claim 7 wherein the one or more parameters is/are configurable.]

[9. The LED driver/dimmer of claim 8 wherein the one or more configurable parameters provided to the secondary controller via the algorithm enables an operating mode of the LED driver/dimmer to be changed.]

[10. The LED driver/dimmer of claim 1 wherein each of the set of output current drivers comprises a converter with hysteretic control.]

[11. The LED driver/dimmer of claim 1 further comprising:

a set of in-circuit serial programming (ICSP) ports, each of the set of ICSP ports associated with one of the set of output current drivers for configuration of the set of output current drivers.]

[12. A configurable light emitting diode (LED) driver/dimmer for controlling a set of light fixture loads comprising:

a power circuit including:

an inrush current limit;

a DC/DC converter;

a power factor correction (PFC) boost connected to the inrush current limit and the DC/DC converter;

a regulated output voltage bus connected to the DC/DC converter; and a primary controller for controlling the power circuit;

a set of output current drivers, each of the set of output current drivers connected to one of the set of light fixture loads for controlling the associated light fixture load; and at least one power limit associated with the set of output current drivers;

a set of load controllers for controlling the set of output current drivers;

wherein the set of load controllers receive LED control information to control outputs of the set of output current drivers; and wherein the set of load controllers receive a program comprising an algorithm for converting LED control information and establish a conversion between the LED control information and the output power channel based on the algorithm.]

[13. The LED driver/dimmer of claim 12 further comprising:

a programming port associated with at least one of the set of load controllers for configuring the LED driver/dimmer.]

[14. The LED driver/dimmer of claim 12 further comprising a communication interface for receiving data from an external transmitter and for transmitting the data to at least one of the set of load controllers, via a secondary controller, wherein the data is a communication protocol.]

[15. The LED driver/dimmer of claim 14 further comprising an isolation barrier for separating the set of load controllers and the communication interface.]

[16. The LED driver/dimmer of claim 14 wherein the communication interface is either DMX512A, 0-10 Vdc analog control, Zigbee wireless or Remote Device Management (RDM) compatible.]

[17. The LED driver/dimmer of claim 14 further comprising an auxiliary flyback converter to provide power to the primary controller and communication interface.]

[18. The LED driver/dimmer of claim 12 wherein the algorithm is based on one or more parameters of at least one of the set of light fixture loads or the set of output current drivers.]

[19. The LED driver/dimmer of claim 18 wherein the one or more parameters is/are configurable.]

[20. The LED driver/dimmer of claim 19 wherein the one or more configurable parameters provided to at least one of the set of load controllers via the algorithm enables an operating mode of the LED driver/dimmer to be changed.]

*21. An LED driver/dimmer for controlling a light fixture load comprising:*

*a power circuit including:*

*an inrush current limit;*

*a DC/DC converter;*

*a power factor correction (PFC) boost connected to the inrush current limit and the DC/DC converter;*

*a regulated output voltage bus connected to the DC/DC converter; and*

*at least one power limit connected to the regulated output voltage bus;*

*a primary controller for controlling the power circuit;*

*an output current driver coupled to the regulated output voltage bus of the power circuit and configured to be connected to the light fixture load;*

*a communication interface configured to be connected to an external transmitter; and*

*a secondary controller coupled to the communication interface and the output current driver and configured to receive an intensity level sent to a first address from the external transmitter through the communication interface and to control an output of the output current driver based on the intensity level.*

*22. The LED driver/dimmer of claim 21, further comprising: a programming port associated with the secondary controller for configuring the LED driver/dimmer.*

*23. The LED driver/dimmer of claim 21, wherein the communication interface utilizes a DMX512A protocol.*

*24. The LED driver/dimmer of claim 21, wherein the communication interface utilizes a Zigbee wireless protocol.*

*25. The LED driver/dimmer of claim 21, further comprising an in-circuit serial programming (ICSP) port for configuration of the output current driver.*

*26. The LED driver/dimmer of claim 21, wherein the secondary controller is further configured to generate LED control information, based on the intensity level, and use the LED control information to control an output of the output current driver.*

*27. The LED driver/dimmer of claim 26, wherein the LED control information is further based on one or more parameters of the light fixture load or the output current driver.*

*28. The LED driver/dimmer of claim 27, wherein the one or more parameters is/are configurable.*

*29. The LED driver/dimmer of claim 28, wherein the one or more parameters enable an operating mode of the LED driver/dimmer to be changed.*

*30. The LED driver/dimmer of claim 26, wherein the output current driver is configured to provide power as pulsed current to the light fixture load based on the LED control information.*

*31. The LED driver/dimmer of claim 26, the output current driver comprising a load controller configured to receive the LED control information from the secondary controller and use the LED control information to generate a digital signal to control the output of the output current driver.*

*32. The LED driver/dimmer of claim 21, further comprising a second output current driver coupled to the regulated output voltage bus of the power circuit and configured to be connected to a second light fixture load.*

*33. The LED driver/dimmer of claim 32, wherein the secondary controller is further configured to control an output of the second output current driver based on the intensity level.*

*34. The LED driver/dimmer of claim 32, wherein the secondary controller is further configured to receive a second intensity level sent to a second address from the external transmitter through the communication interface and to control an output of the second output current driver based on the second intensity level.*

*35. The LED driver/dimmer of claim 21, further comprising a peak current set point parameter associated with the output current driver, wherein the peak current set point parameter is configurable.*

*36. The LED driver/dimmer of claim 35, wherein the output current driver is configured to provide a power signal, based on the intensity level, to the light fixture load as pulsed current having a peak current based on the peak current set point parameter.*

*37. A method for controlling a light fixture load using an LED driver/dimmer, the method comprising:*

*receiving AC power at a power circuit of the LED driver/dimmer, the power circuit including an inrush current limit, a DC/DC converter, a power factor correction (PFC) boost connected to the inrush current limit and the DC/DC converter, a regulated output voltage bus connected to the DC/DC converter, and at least one power limit connected to the regulated output voltage bus;*

*converting the AC power to regulated DC power on the regulated output voltage bus using the power circuit under control of a primary controller;*

*providing the regulated DC power to an output current driver of the LED driver/dimmer that is connected to the regulated output voltage bus;*

*receiving, at a secondary controller of the LED driver/dimmer through a communication interface of the LED driver/dimmer, an intensity level sent to a first address by an external transmitter;*

*controlling, by the secondary controller, the output current driver based on the intensity level; and*

*providing a power signal from the output current driver to the light fixture load, the power signal having a peak current based on a configurable peak current set point parameter for the output current driver.*

*38. The method of claim 37, wherein the communication interface utilizes a Zigbee wireless or a DMX512A protocol.*

*39. The method of claim 37, further comprising providing pulsed current as the power signal provided from the output current driver to the light fixture load.*

*40. The method of claim 37, further comprising:*

*providing the regulated DC power to a second output current driver of the LED driver/dimmer that is connected to the regulated output voltage bus;*

*receiving, at the secondary controller through the communication interface, a second intensity level sent to a second address by the external transmitter;*

*controlling, by the secondary controller, a second output current driver based on the second intensity level; and*

*providing a second power signal from the second output current driver to a second light fixture load, the second*

*power signal having a peak current based on a configurable second peak current set point parameter for the output current driver.*

*41. The method of claim 37, further comprising:*

*providing the regulated DC power to a second output current driver of the LED driver/dimmer that is connected to the regulated output voltage bus;*

*controlling, by the secondary controller, a second output current driver based on the intensity level; and*

*providing a second power signal from the second output current driver to a second light fixture load, the second power signal having a peak current based on a configurable second peak current set point parameter for the output current driver.*

* * * * *